United States Patent
Tait et al.

(10) Patent No.: US 11,269,179 B2
(45) Date of Patent: Mar. 8, 2022

(54) PHOTONIC FILTER BANK SYSTEM AND METHOD OF USE

(71) Applicant: The Trustees of Princeton University, Princeton, NJ (US)

(72) Inventors: Alexander N. Tait, Brooklyn, NY (US); Allie X. Wu, Florham Park, NJ (US); Thomas Ferreira de Lima, Princeton, NJ (US); Mitchell A. Nahmias, Menlo Park, CA (US); Bhavin J. Shastri, Lawrenceville, NJ (US); Paul R. Prucnal, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 16/855,222

(22) Filed: Apr. 22, 2020

(65) Prior Publication Data
US 2020/0249472 A1    Aug. 6, 2020

Related U.S. Application Data

(62) Division of application No. 16/374,991, filed on Apr. 4, 2019, now Pat. No. 10,670,860.

(60) Provisional application No. 62/804,001, filed on Feb. 11, 2019, provisional application No. 62/664,386, filed on Apr. 30, 2018.

(51) Int. Cl.
*G02B 27/00* (2006.01)
*G02F 1/225* (2006.01)

(52) U.S. Cl.
CPC ......... *G02B 27/0012* (2013.01); *G02F 1/225* (2013.01)

(58) Field of Classification Search
None
See application file for complete search history.

(56) References Cited

U.S. PATENT DOCUMENTS

| 7,421,168 | B1 | 9/2008 | Goutzoulis |
| 7,474,408 | B2 | 1/2009 | Alphonse |
| 8,027,587 | B1 | 9/2011 | Watts |
| 10,009,135 | B2 | 6/2018 | Tait et al. |
| 10,670,860 | B2 * | 6/2020 | Tait .................. G02B 27/0012 |
| 2004/0184711 | A1 | 9/2004 | Bradley et al. |
| 2006/0067696 | A1 | 3/2006 | Kai |
| 2007/0230871 | A1 | 10/2007 | Bidnyk et al. |
| 2011/0234435 | A1 | 9/2011 | Woodward et al. |

(Continued)

OTHER PUBLICATIONS

International Search Report and Written Opinion for PCT Application No. PCT/US2019/025737 dated Aug. 2, 2019.

(Continued)

*Primary Examiner* — Tina M Wong
(74) *Attorney, Agent, or Firm* — Jeffrey Schox; Samuel Rosenthal

(57) ABSTRACT

A system for photonic computing, preferably including: an input module, computation module, and/or control module, wherein the computation module preferably includes one or more filter banks and/or detectors. A photonic filter bank system, preferably including two waveguides and a plurality of optical filters arranged between the waveguides. A method for photonic computing, preferably including: controlling a computation module; controlling an input module; and/or receiving outputs from the computation module.

14 Claims, 14 Drawing Sheets

(56) References Cited

U.S. PATENT DOCUMENTS

| | | |
|---|---|---|
| 2014/0366647 A1 | 12/2014 | Steinhardt et al. |
| 2016/0047988 A1 | 2/2016 | Liu et al. |
| 2017/0214472 A1 | 7/2017 | Caplan et al. |
| 2017/0336564 A1 | 11/2017 | Soref |
| 2019/0187380 A1 | 6/2019 | Fanto et al. |
| 2019/0199060 A1 | 6/2019 | Parker et al. |
| 2019/0331912 A1 | 10/2019 | Tait et al. |
| 2020/0249472 A1* | 8/2020 | Tait .................... G02B 27/0012 |

OTHER PUBLICATIONS

Tait, A.N. et al., "Microring Weight Bank Designs with Improved Channel Density and Tolerance" IEEE, 978-1-5090-6577, 2017, pp. 101-102.

Tait, Alexander N. et al. Broadcast and Weight: An Integrated Network for Scalable Photonic Spike Processing, Journal of Lightwave Technology. vol. 32 No. 21, Nov. 21, 2014.

Tait, Alexander N. et al. "Two-pole microring weight banks" Optics Letters, vol. 43, No. 10, May 15, 2018, pp. 2276-2279.

Clements, William R. et al., "Optimal design for universal multiport interferometers", Optica, vol. 3, No. 12, Dec. 2016, 6 pages.

Darmawan, S. et al., "Nested ring Mach-Zehnder interferometer" Optics Express, vol. 15, No. 2, Jan. 22, 2007.

Govdeli et al. "Integrated Optical Modulator Based on Transition between Photonic Bands", SCiEnTifiC REPOrTS | (2018) 8:1619 | DOI:10.1038/s41598-018-20097-7.

Gutierrez, A.M. "Ring-Assisted Mach-Zhnder Interferometer Silicon Modulator for Enhanced Performance" Journal of Lightwave Technology, vol. 30, No. 1, Jan. 1, 2012, 6 pages.

Jin, Weiliang et al., "Inverse Design of Compact Multimode Cavity Couplers" Optics Express, vol. 26, No. 20, Oct. 1, 2018, 9 pages.

Kocaman, S. et al. "Zero phase delay in negative-refractive-index photonic crystal superlattices" Nature Photonics | vol. 5 | Aug. 2011 | www.nature.com/naturephotonics.

Le, Trung-Thanh "New Approach to Mach-Zehnder Interferometer (MZI) Cell Based on Silicon Waveguides for Nanophonic Circuits", IntechOpen, 2018, 16 pages.

Lu, Liangjun "Low-power 2X2 silicon electro-optic switches based on double-ring assisted Mach-Zehnder interferometers", Optic Letters, vol. 39, No. 6, Mar. 15, 2014, 4 pages.

Moazeni et al. "A 40-Gb/s PAM-4 Transmitter Based on a Ring-Resonator Optical DAC in 45-nm SOI CMOS" IEEE Journal of Solid-State Circuits, vol. 52, No. 12, Dec. 2017.

Moazeni, Sajjid et al. A 40-Gb/s PAM-4 Transmitter Based on a Ring-Resonator Optical DAC in a 45-nm SOI CMOS, IEEE Journal of Solid-State Circuits, vol. 52, No. 12, Dec. 2017, 14 pages.

Rosenberg, J. C. et al. "A 25 Gbps silicon microring modulator based on an interleaved junction" Nov. 19, 2012 / vol. 20, No. 24 / Optics Express.

Settle, Michael et al. "Low loss silicon on insulator photonic crystal waveguides made by 193nm optical lithography" Mar. 20, 2006 / vol. 14, No. 6 / Optics Express 2440.

Shainline, Jeffrey M. et al. "Depletion-mode carrier-plasma optical modulator in zero-change advanced CMOS", Aug. 1, 2013 / vol. 38, No. 15 / Optics Letters.

Song, Junfeng, et al. "Passive ring-assisted Mach-Zehnder interleaver on silicon-on-insulator" Optics Express, vol. 16., No. 12 Jun. 9, 2008, 7 pages.

Timurdogan, Erman "An Interior-Ridge Silicon Microring Modulator" Journal of Lightwave Technology, vol. 31, No. 24, Dec. 15, 2013, 8 pages.

Timurgan, Erman, "An Ultralow power athermal silicon modualor" Nature Communications, DOI: 10.1038/ncomms5008, published Jun. 11, 2014, 11 pages.

Xiao, Xi et al., "44-Gb/s Silicon Microring Modulators Based on Zigzag PN Junctions", IEEE Photonics Technology Letters, vol. 24, No. 19, Oct. 1, 2012, 3 pages.

* cited by examiner

PHOTONIC FILTER BANK SYSTEM AND METHOD OF USE

CROSS-REFERENCE TO RELATED APPLICATIONS

This application is a divisional of U.S. Nonprovisional patent application Ser. No. 16/374,991 filed 4 Apr. 2019 which claims the benefit of U.S. Provisional Application Ser. No. 62/664,386, filed on 30 Apr. 2018, and U.S. Provisional Application Ser. No. 62/804,001, filed on 11 Feb. 2019, all of which are incorporated in their entirety by this reference.

STATEMENT OF GOVERNMENT SUPPORT

This invention was made with government support under Grant No. ECCS-1642962 awarded by the National Science Foundation. The government has certain rights in the invention.

TECHNICAL FIELD

This invention relates generally to the photonic filtering field, and more specifically to a new and useful optical filter bank system and method of use in the photonic filtering field.

BACKGROUND

Typical photonic filter bank systems may suffer from super-resonances and/or other issues relating to leakage, which can result in spurious output signals and/or reductions in accuracy. Thus, there is a need in the photonic filtering field to create a new and useful optical filter bank system and method of use.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
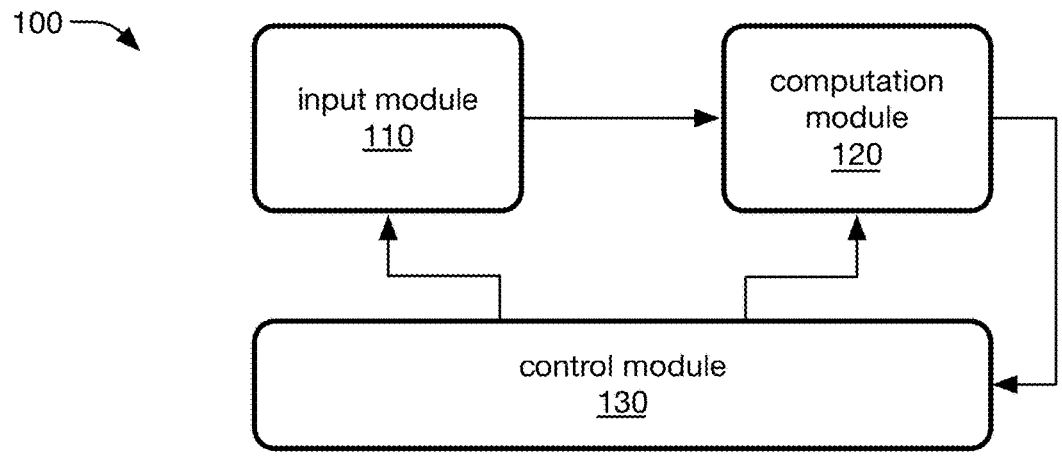
FIGS. 1A-1B are schematic representations of an embodiment of the system and an example of the embodiment, respectively.
Figure 1B:
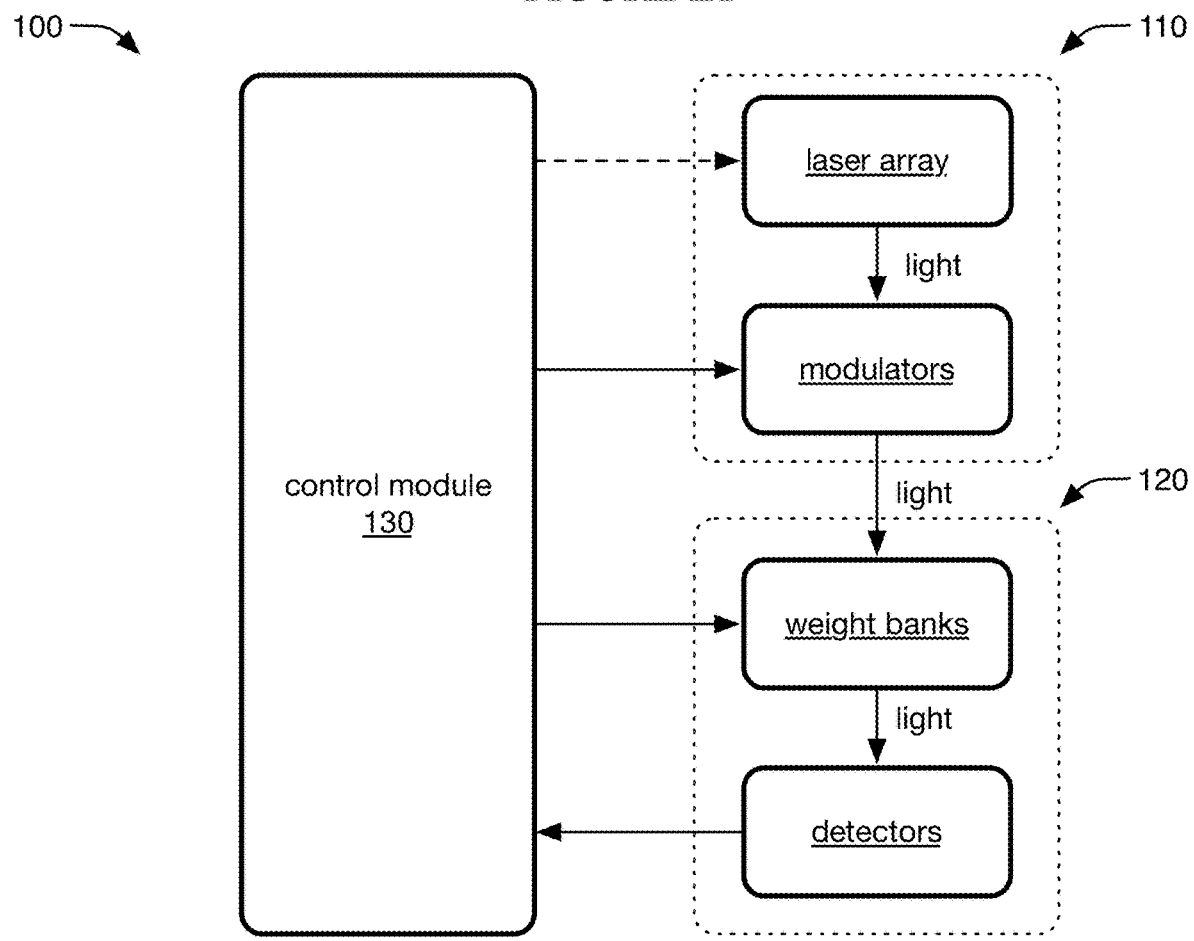

A system 100 for photonic computing preferably includes an input module 110, computation module 120, and/or control module 130 (e.g., as shown in FIGS. 1A-1B). In some embodiments, the system includes one or more elements such as described in U.S. Pat. No. 10,009,135, issued 26 Jun. 2018 and titled "System and Method for Photonic Processing", which is hereby incorporated in its entirety by this reference. However, the system can additionally or alternatively include any other suitable elements.

The system and/or elements thereof are preferably implemented as one or more integrated circuits. For example, the photonic modules (e.g., input module, computation module) and/or subsets thereof can be and/or include one or more photonic integrated circuits, and/or the entire system can be a portion of a single integrated circuit. However, the system can additionally or alternatively be implemented in any other suitable device structure(s).

1.1 Input Module.

Figure 12A:
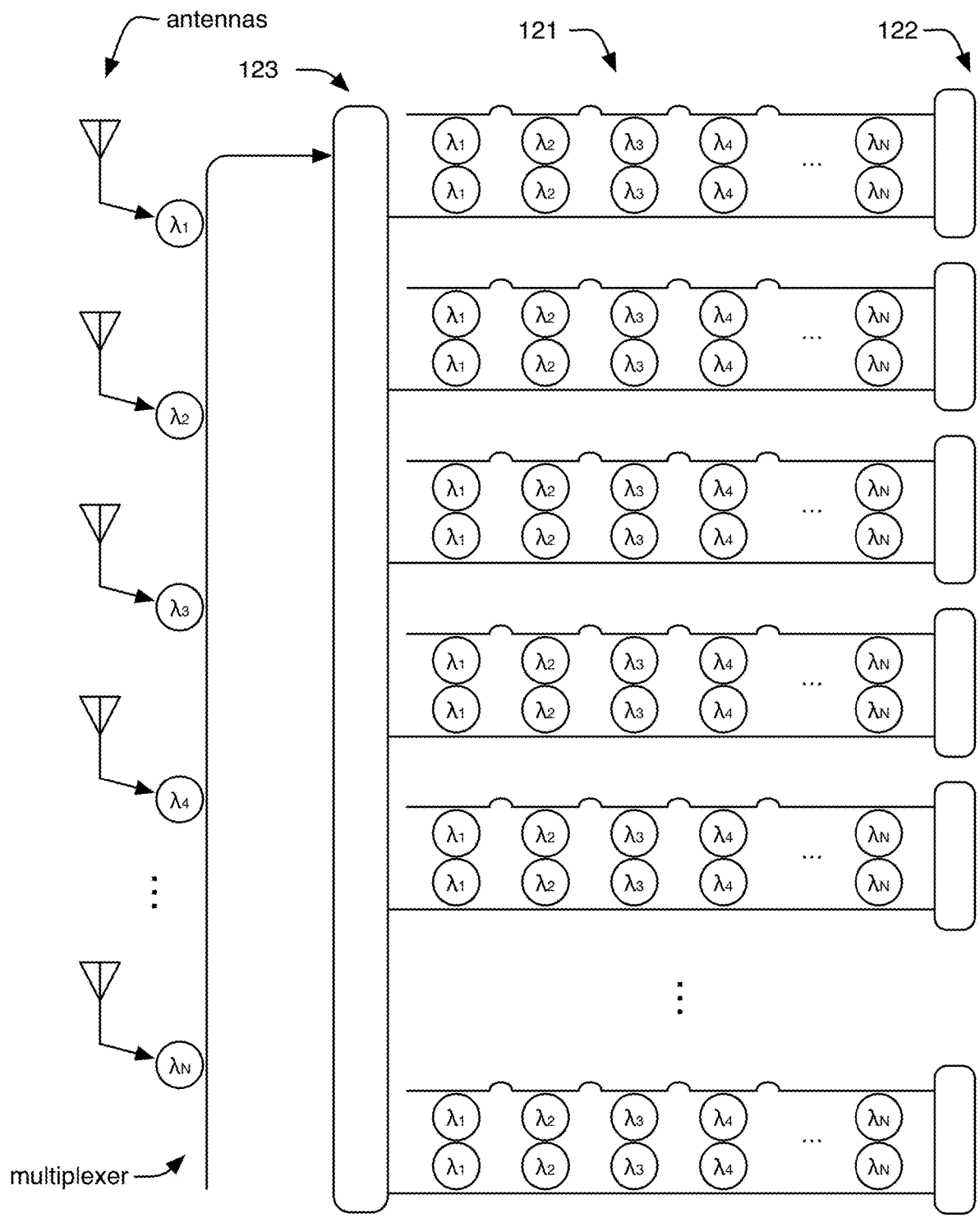
FIGS. 12A-12B are schematic representations of a variation of the system and an example of the variation, respectively.
Figure 12B:
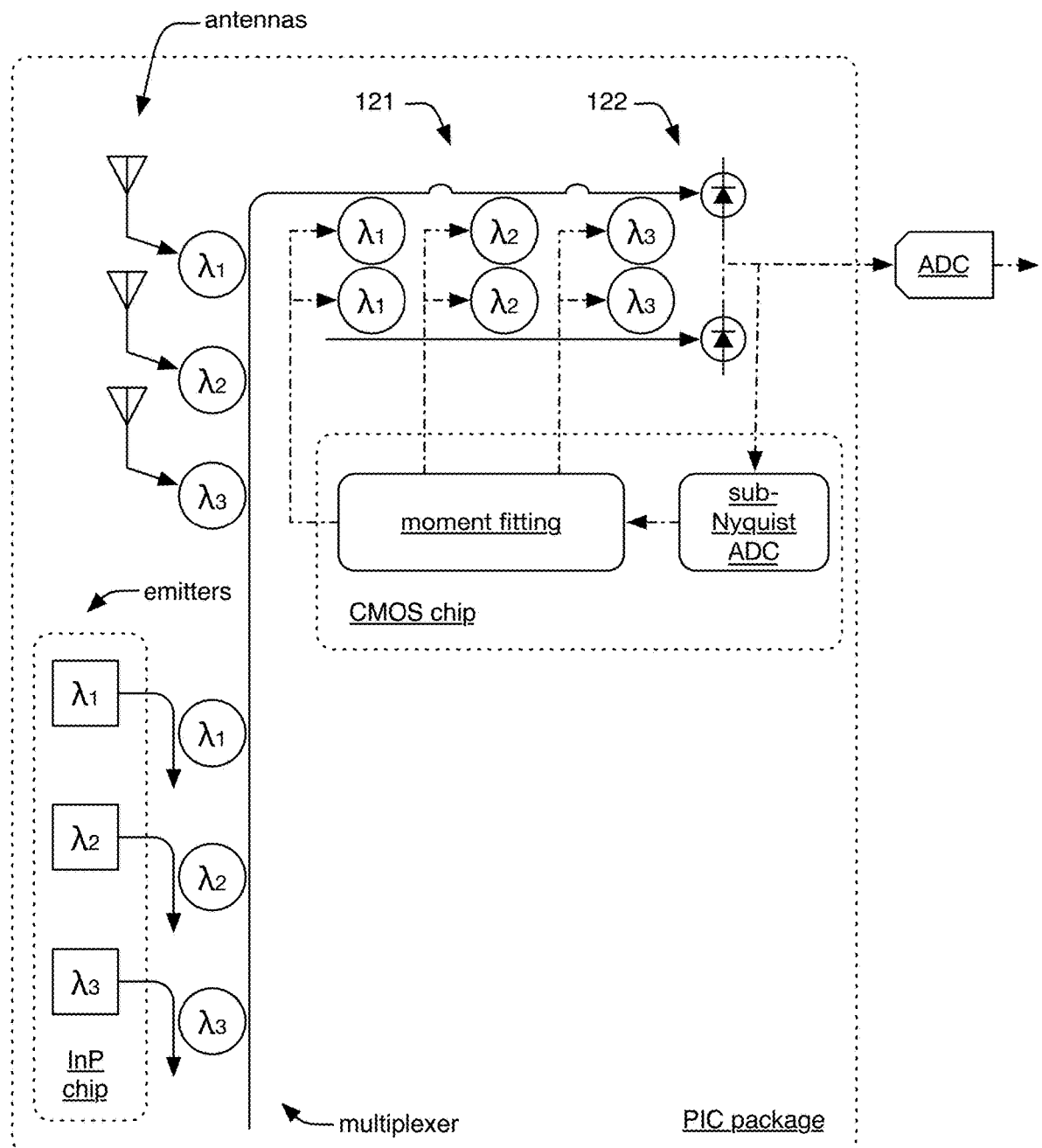

The input module 110 preferably functions to generate a photonic representation of an input signal. The input signal is preferably representative of an input vector (e.g., encodes the input vector). However, the input signal can additionally or alternatively represent one or more radio frequency signals (e.g., from a beamformer radio transceiver, from a duplex communication system, etc.; such as shown in FIGS. 12A-12B) and/or any other suitable signals. The input module preferably includes one or more transducers and a multiplexer, and can additionally or alternatively include any other suitable elements.

The transducers preferably function to control light emission at various wavelengths. The input module preferably includes a plurality of transducers. Each transducer preferably controls a different emission channel (e.g., wavelength channel). For example, each transducer can control a different emission channel near (e.g., within a threshold distance of, substantially centered around, etc.) the 1.3 micron and/or 1.55 micron wavelength (e.g., within the 1.26-1.36 micron O-band, within the 1.53-1.565 micron C-band and/or the 1.565-1.625 micron L-band, etc.). The wavelength channels are preferably narrow-band channels, such as channels of less than a threshold bandwidth (e.g., 1, 2, 5, 10, 15, 25, 40, 65, 100, 200, 500, 1000 GHz, 1-5, 5-20, 20-100, 100-300, and/or 300-1000 GHz frequency bandwidth; 0.01, 0.02, 0.05, 0.1, 0.2, 0.5, 1, 2, 5, 10, 0.01-0.05, 0.05-0.2, 0.2-1, 1-3, or 3-10 nm spectral bandwidth; etc.), but can additionally or alternatively include intermediate- and/or wide-band channels and/or channels of any other suitable widths. Alternatively, a single transducer can control multiple emission channels, and/or the transducers can emit light of any other suitable wavelength(s). Each channel preferably corresponds to a different element of the input vector.

The channels are preferably non-overlapping, more preferably having at least (and/or at most) a threshold spacing (e.g., threshold amount relative to the channel width, such as 5, 10, 25, 50, 100, 110, 125, 150, 175, 200, 250, 300, 400, 500, 0-1, 1-5, 5-15, 15-30, 30-60, 60-100, 100-110, 110-120, 120-150, 150-200, 200-300, or 300-500% of the channel width; absolute threshold amount, such as 0.1, 0.2, 0.5, 1, 2, 5, 10, 15, 20, 30, 40, 50, 75, 100, 150, 250, 0.1-1, 1-5, 5-15, 15-45, 45-100, or 100-300 GHz; etc.) between each other (e.g., center-to-center distance, edge-to-edge distance, etc.). However, all or some of the channels can alternatively be overlapping (e.g., by no more and/or no less than a threshold amount, such as described above regarding the threshold spacing) and/or have any other suitable relationship to each other. The channels and/or emitters can be indexed based on wavelength (e.g., from shortest to longest wavelength, such as channel 1 being associated with the shortest wavelength, channel 2 being associated with the second shortest wavelength, etc.). A person of skill in the art will recognize that "wavelength" is typically used herein to refer to the free-space wavelength of the light, regardless of the medium in which the light is propagating and the resulting medium-dependent wavelength of that light, and that light of a particular (free-space) wavelength is associated with a constant optical frequency (which is unchanged by the medium of propagation); analogously, a person of skill in the art will recognize that wavelength-selective elements, such as wavelength-selective filters, can be understood to be analogous to optical frequency-selective elements.

The transducer preferably couples light into one or more structures (e.g., on a chip), such as waveguides. The transducer is preferably an optical transducer, more preferably an electro-optical transducer (e.g., which outputs lights based on an electrical input), but can additionally or alternatively be any other suitable transducer. For example, the input module can include one or more transducers such as described in U.S. Pat. No. 10,009,135, issued 26 Jun. 2018 and titled "System and Method for Photonic Processing", which is hereby incorporated in its entirety by this reference.

In one embodiment, each transducer includes an emitter and an amplitude modulator. The emitter is preferably a laser (e.g., diode laser, preferably a component of an integrated circuit), such as a distributed feedback laser, but can additionally or alternatively include an LED and/or any other suitable light emitter. The transducer preferably includes one amplitude modulator for each emitter and/or each channel. The amplitude modulator is preferably an optical modulator, but can additionally or alternatively be an emitter modulator or any other suitable modulator.

The optical modulator preferably functions to modulate light emitted by an emitter (or multiple emitters). The optical modulator is preferably wavelength-selective (e.g., substantially modulating only a narrow wavelength band, such as substantially modulating only light of a single channel), but can alternatively be a wideband modulator and/or have any other suitable wavelength dependence. The optical modulator can be electro-absorptive and/or electro-refractive. The optical modulator can optionally be embedded in one or more other structures, such as a resonator and/or Mach-Zehnder interferometer (MZI), which can function to enhance its modulation performance. In examples, the optical modulator can include one or more microresonators (e.g., microring resonator, microdisk resonator, photonic crystal defect state modulator), quantum confined Stark effect (QCSE) modulator, Zeno effect modulator (e.g., graphene based modulator, such as a silicon photonic graphene modulator), MZI modulator, electro-absorptive modulator embedded in a critically coupled resonator (e.g., QCSE microdisk modulator), and/or any other suitable optical modulator. In some variations, the optical modulator includes multiple microresonators (e.g., as described below and/or in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference; as shown in FIGS. 5B, 5C, 6A, and/or 6B; etc.). In some variations, the optical modulator includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). However, the system can additionally or alternatively include any other suitable optical modulators, or include no such modulators.

The emitter modulator can function to control light emission from the emitter (or from multiple emitters). For example, the emitter modulator can provide an electrical signal that drives the associated emitter, or there can be no emitter modulator, wherein the input signal (e.g., electrical signal, such as from the control module) directly drives the emitter. In a specific example, in which the transducer is a laser device, the modulated laser gain medium can be an active optical semiconductor, which can act as a subthreshold temporal integrator with time-constant equal to carrier recombination lifetime. The laser device itself can act as a threshold detector, rapidly dumping energy stored in the gain medium into the optical mode when the net gain of the cavity crosses unity (e.g., similar to a passively Q-switched laser biased below threshold). However, the input modulator can additionally or alternatively include any other suitable emitter modulator(s), and/or any other suitable modulators of any kind(s).

The transducers can additionally or alternatively include any other suitable elements. The transducers of the input module can be substantially the same as each other (e.g., aside from emitting at and/or modulating different wavelengths), or can be different from one another.

The multiplexer preferably functions to combine multiple optical signals (e.g., channels) onto a single output path (e.g., a waveguide), such as for wavelength-division multiplexing (WDM). The multiplexer is preferably an optical multiplexer, such as an arrayed waveguide grating (AWG), but can additionally or alternatively be any other suitable multiplexer.

Figure 2A:
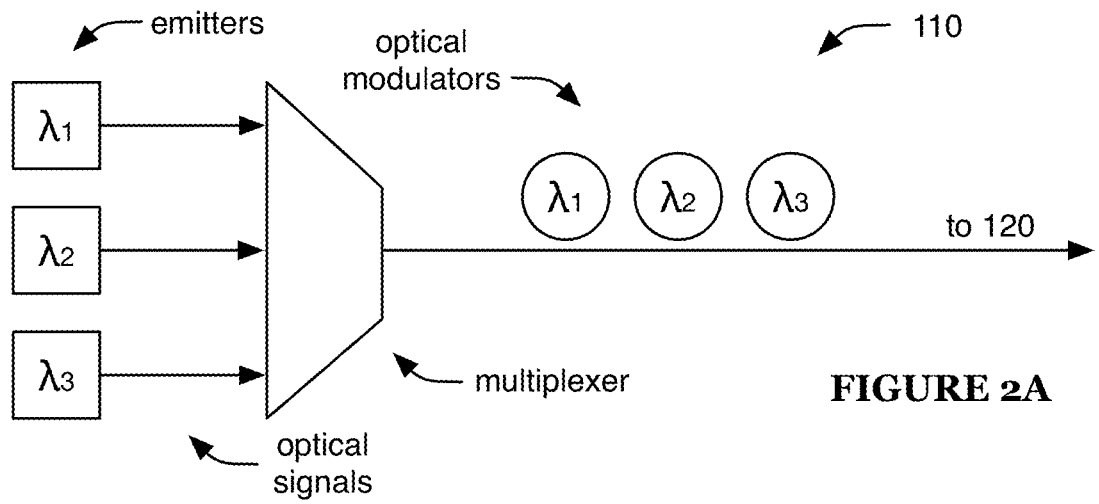
FIGS. 2A-2C are schematic representations of a first, second, and third embodiment, respectively, of the input module.

In a first embodiment of the input module, signals (e.g., unmodulated signals) from multiple emitters are combined by a multiplexer, then modulators (preferably wavelength-selective modulators, such as microresonators) alter the multiplexed signals (e.g., as shown in FIG. 2A). Preferably, each wavelength-selective modulator alters a single signal, wherein the other signals (e.g., wavelengths) pass through and/or by the modulator substantially unaltered. Additionally or alternatively, some or all of the modulators can substantially affect more than one of the signals.

Figure 2B:
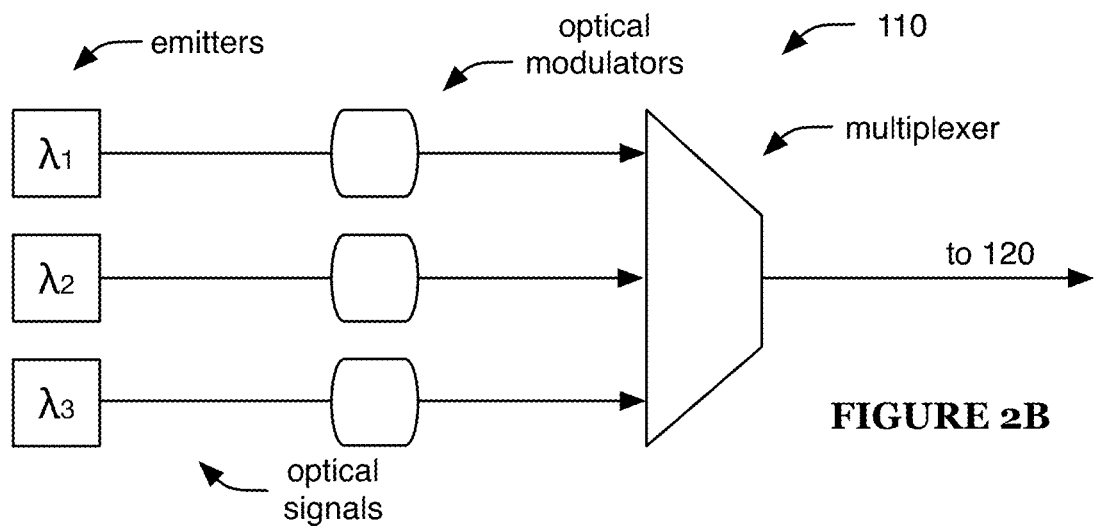
Figure 2C:
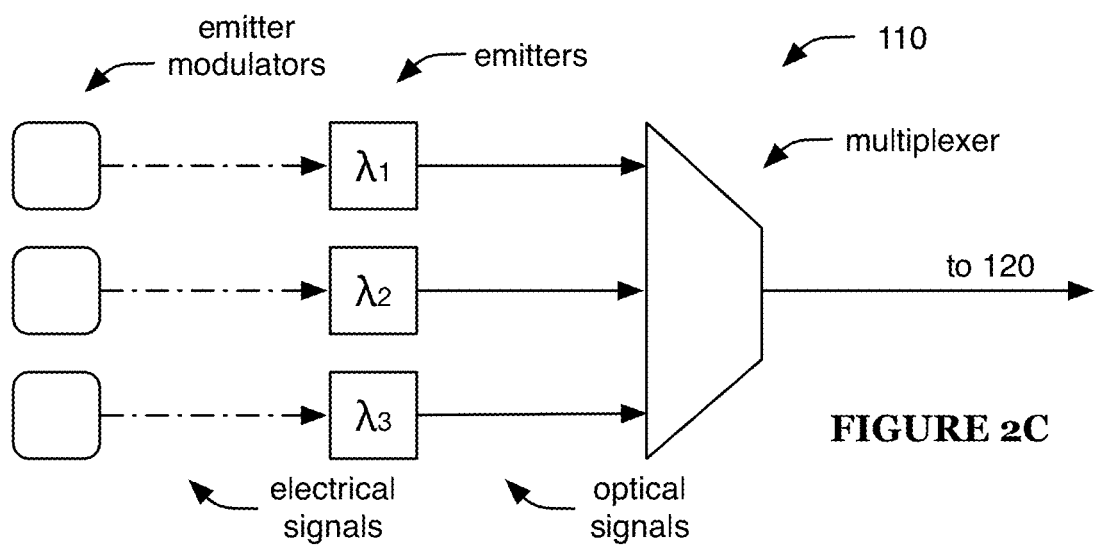

In a second embodiment, modulated signals from multiple optical transducers (e.g., electro-optical transducers) are combined by a multiplexer. In a first example of this embodiment, an optical modulator is arranged between each emitter and the multiplexer (e.g., as shown in FIG. 2B). In a second example, an emitter modulator controls each emitter (e.g., as shown in FIG. 2C).

The input module is preferably controlled by the control module (e.g., by electrical signals from the control module). The input module preferably outputs to the computation module (e.g., the WDM optical signal is sent to an input of the computation module, preferably along a waveguide). However, the input module can additionally or alternatively interface with other elements of the system in any other suitable manner, and/or the input module can additionally or alternatively include any other suitable elements in any suitable arrangement.

1.2 Computation Module.

Figure 3A:
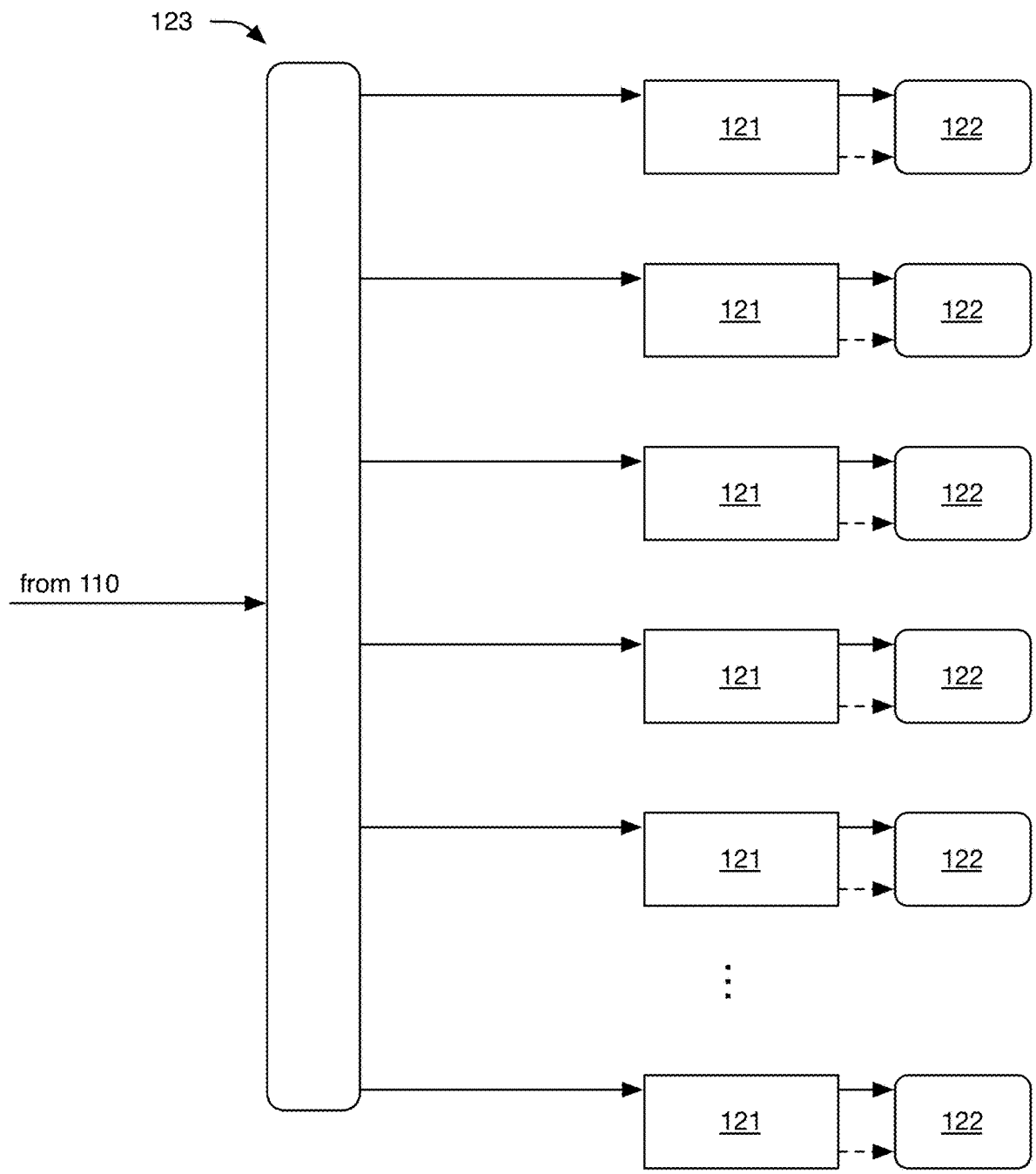
FIGS. 3A-3B are schematic representations of an embodiment of the computation module and an example of the embodiment, respectively.
Figure 3B:
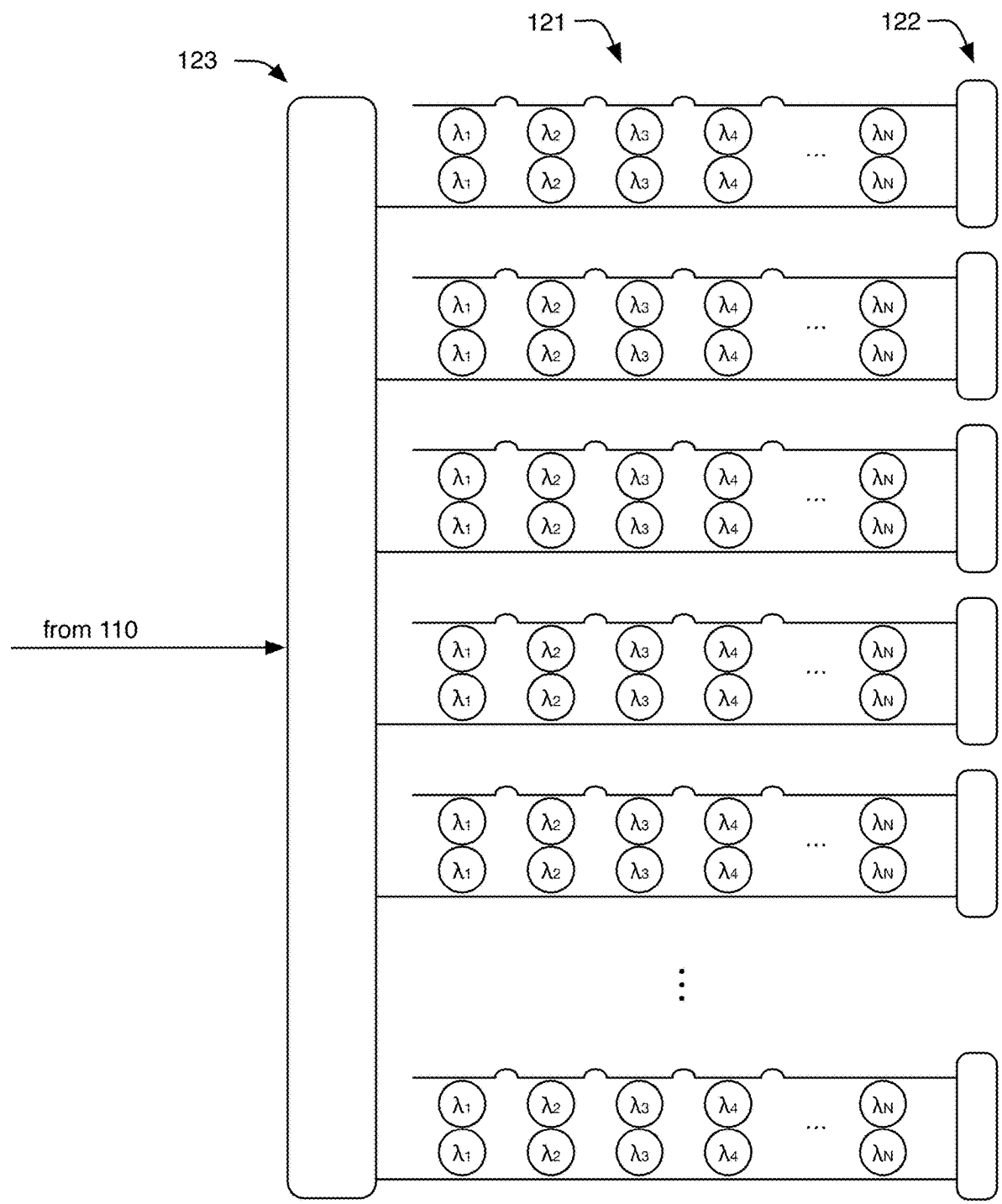
Figure 8A:
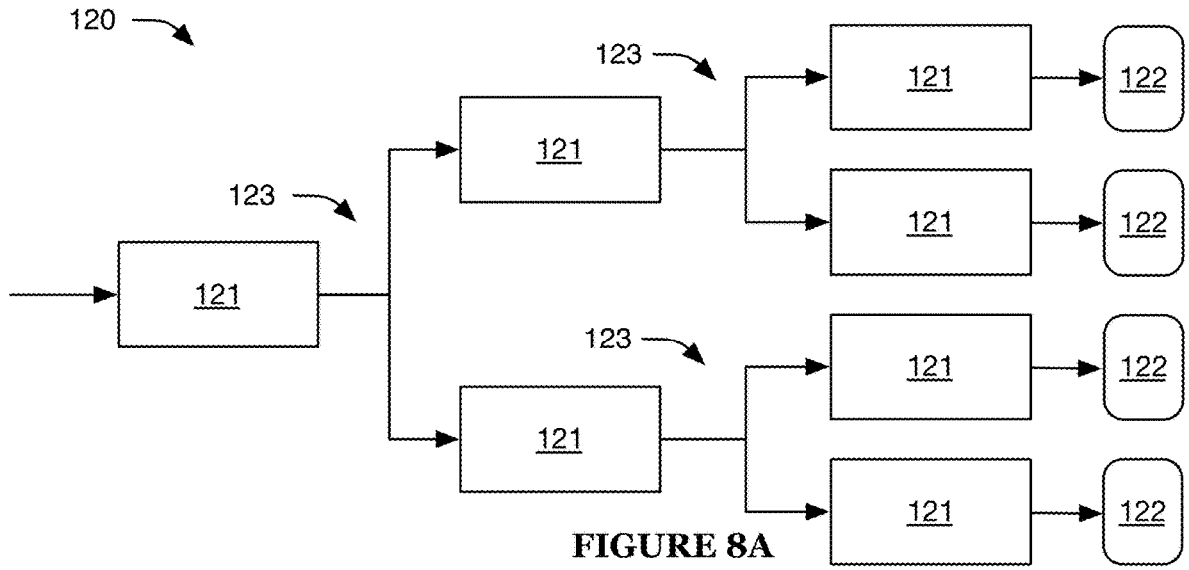
FIGS. 8A-8B are schematic representations of a first alternate embodiment of a portion of the computation module and an example of the first alternate embodiment, respectively.
Figure 8B:
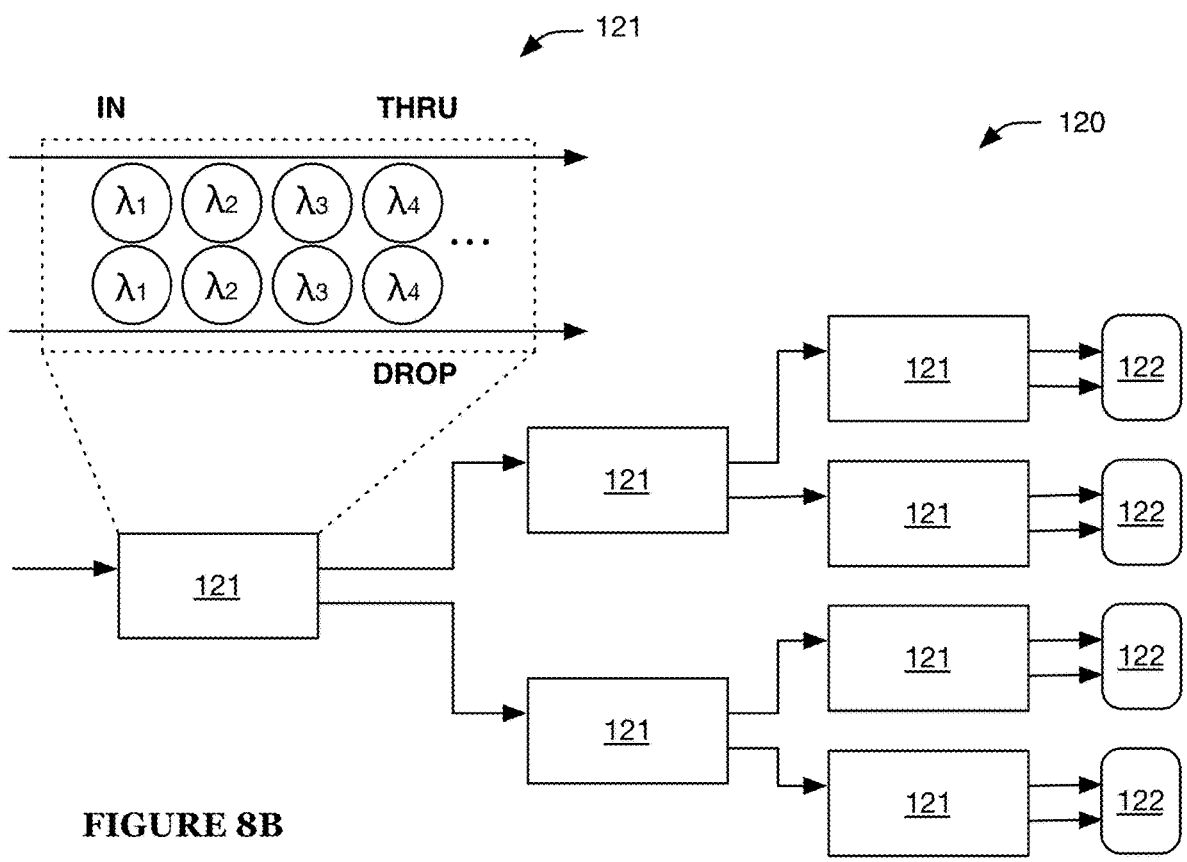

The computation module 120 preferably functions to perform photonic computations (e.g., matrix multiplication) based on signals from the input and/or control modules. For example, the computation module can multiply an input vector (e.g., encoded by the WDM signal received from the input module) by a matrix (e.g., associated with the input signals from the control module) to determine an output vector (e.g., associated with output signals generated by the computation module). The computation module can additionally or alternatively perform other linear operations such as the demixing of high speed radio frequency signals (e.g., through the use of microwave photonic circuits, such as shown by way of example in FIGS. 12A-12B), and/or perform any other suitable operations. The computation module preferably includes one or more spectral filter banks 121 and detectors 122, and can optionally include one or more splitters 123 (e.g., as shown in FIGS. 3A, 3B, 8A, and/or 9B). However, the computation module can additionally or alternatively include any other suitable elements.

Figure 4A:
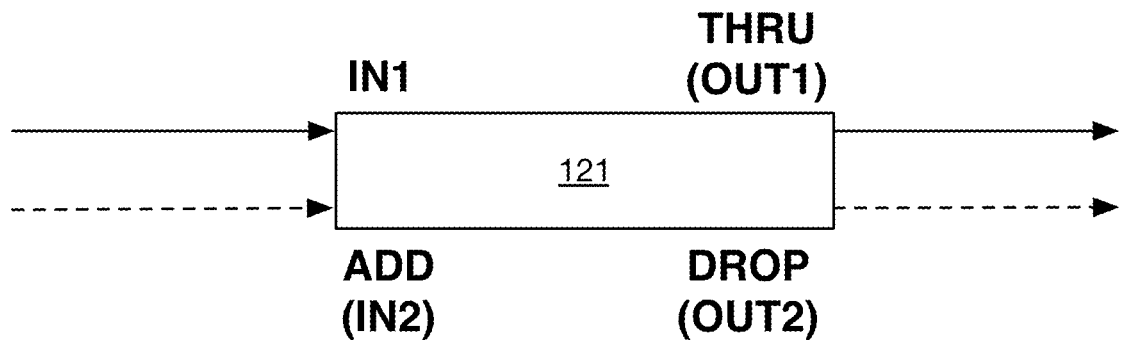
FIGS. 4A-4C are schematic representations of a first, second, and third variation, respectively, of a spectral filter bank.
Figure 4B:
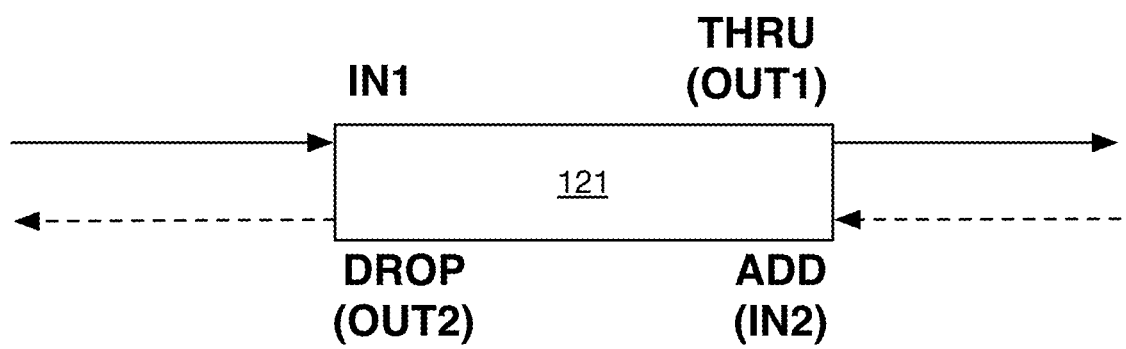
Figure 4C:
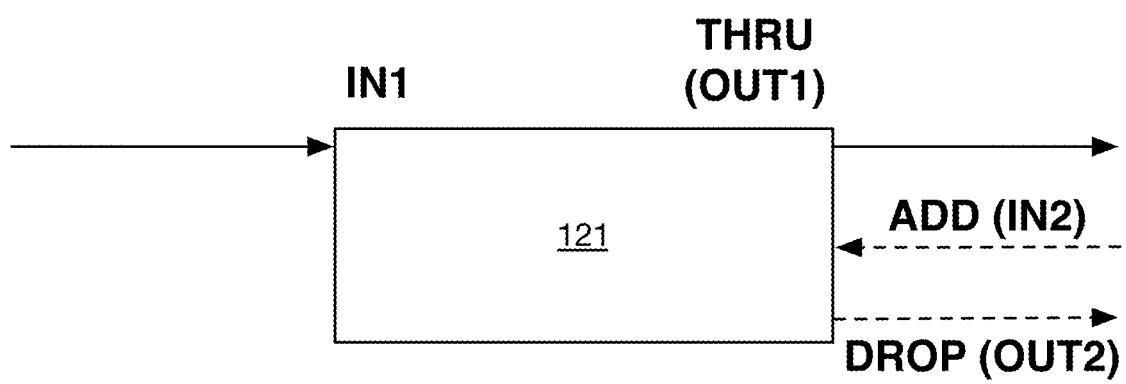

Each spectral filter bank preferably functions to filter (e.g., filter in a substantially time-independent manner; switch, such as at a low rate; modulate at a high rate, such as comparable to the bandwidth of the input optical signal; otherwise control; etc.) an optical signal based on a control signal. The computation module preferably includes a plurality of spectral filter banks (e.g., each corresponding to a row of the matrix). Each spectral filter bank preferably receives (e.g., at an IN port of the spectral filter bank) an optical signal input (e.g., WDM signal) and a set of control signals. The optical signal input is preferably received from the splitter (e.g., along one or more of the paths onto which the signal is split), but can additionally or alternatively be received from any other suitable element. The control signals (e.g., filter weights) are preferably received from the control module, but can additionally or alternatively be received from any other suitable element. The control signals are preferably electrical signals (e.g., voltage signals). The control signals preferably control operation of one or more filter elements of the spectral filter bank. The control signals preferably include one weight for each filter element, but can additionally or alternatively include any other suitable number of weights. The number of filters and number of weights is preferably equal to the number of channels in the optical signal input (e.g., equal to the number of emitters in the input module). Each weight and filter preferably corresponds to an element of the matrix row associated with the spectral filter bank. The spectral filter bank preferably outputs the filtered optical signal(s) (e.g., to one or more detectors). In some examples, the spectral filter bank has multiple optical outputs (e.g., THRU port and DROP port, OUT1 port and OUT2 port, etc.), one or more of which outputs to a detector (e.g., as shown in FIGS. 4A-4C). The spectral filter bank(s) can optionally include weight banks (and/or elements thereof) such as described in U.S. Pat. No. 10,009,135, issued 26 Jun. 2018 and titled "System and Method for Photonic Processing", which is hereby incorporated in its entirety by this reference (e.g., as described regarding the MRR weight bank, such as employing microring resonators, microdisk resonators, any modulators described above regarding the input modulators, and/or any other suitable filters, etc.), such as shown by way of example in FIG. 9B.

Figure 10:
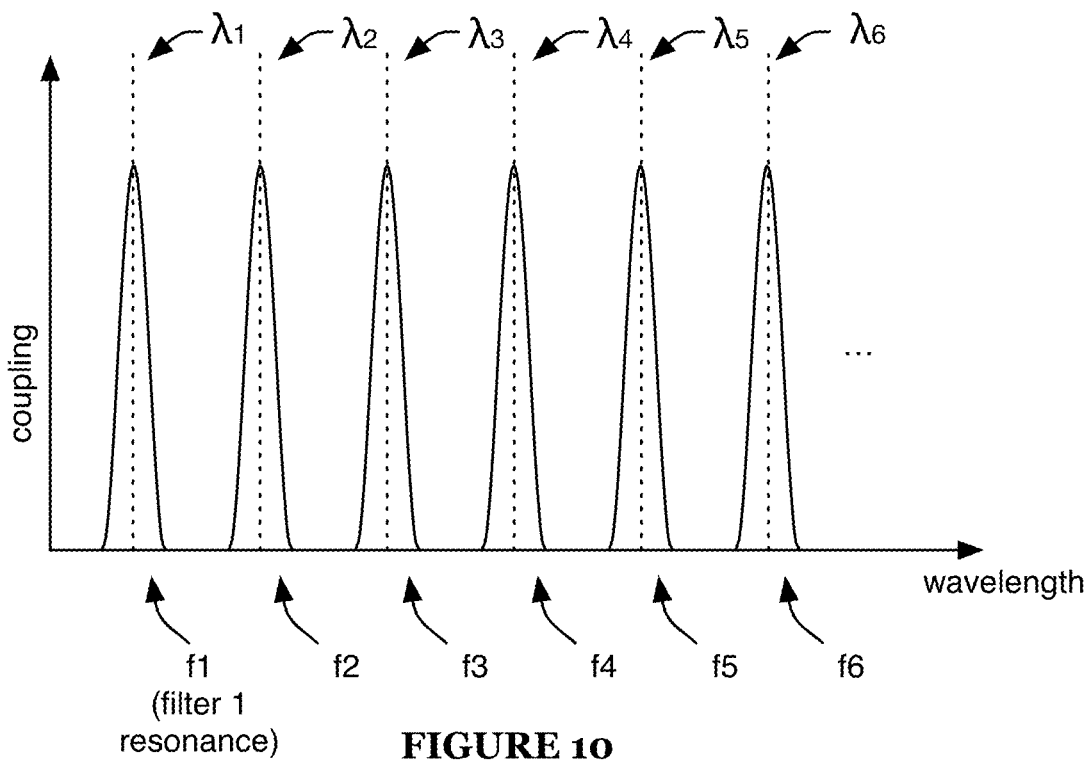
FIG. 10 is a schematic representation of optical channels and filter resonances of an example of the system.

The filter elements (e.g., of the spectral filter banks) preferably function to filter the optical input signal. Every channel preferably propagates past all the filter elements of the spectral filter bank (e.g., as shown in FIGS. 3B, 5B, 5C, 6A, and/or 6B), but can alternatively propagate past only a subset thereof. The filter elements are preferably wavelength-selective optical filters (e.g., substantially filtering only a narrow wavelength band, such as substantially filtering only light of a single channel), such as filters configured to couple a portion of light of a particular wavelength channel (e.g., corresponding to a resonance wavelength of the filter) between two waveguides (e.g., from an input waveguide to an output waveguide). The wavelength-selective optical filters are preferably microresonators (e.g., more preferably micro-disk resonators, but additionally or alternatively including micro-ring resonators, photonic crystal defect state filters, etc.). The optical filter can optionally be embedded in one or more other structures, such as a resonator and/or Mach-Zehnder interferometer (MZI), which can function to enhance its modulation performance and/or alter the modulation mechanism. In some variations, the optical filter includes multiple microresonators (e.g., as described below regarding even-pole filters, as described in the appendix, and/or as described in Alexander N. Tait, Allie X. Wu, Thomas Ferreira de Lima, Mitchell A. Nahmias, Bhavin J. Shastri, and Paul R. Prucnal, "Two-pole microring weight banks," Opt. Lett. 43, 2276-2279 (2018), which is hereby incorporated in its entirety by this reference). In some variations, the optical filter includes multiple filters and/or modulators coupled together using inverse design (e.g., as described in Weiliang Jin, Sean Molesky, Zin Lin, Kai-Mei C. Fu, and Alejandro W. Rodriguez, "Inverse design of compact multimode cavity couplers," Opt. Express 26, 26713-26721 (2018), which is hereby incorporated in its entirety by this reference). Each filter of a spectral filter bank (e.g., weight bank) preferably has a different resonance wavelength (e.g., under fixed conditions). Preferably, each resonance wavelength corresponds to (e.g., is within, such as substantially centered within) a different wavelength channel (e.g., as shown in FIG. 10).

Figure 5A:
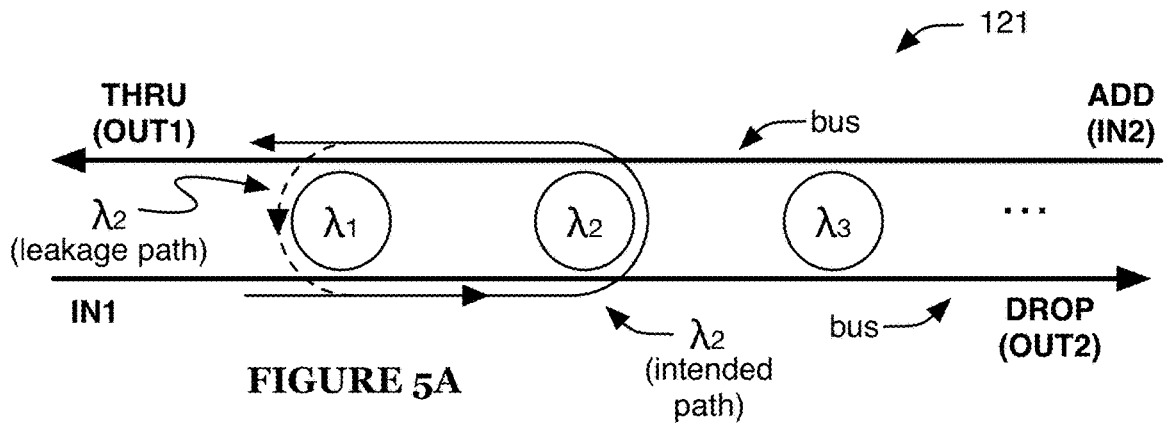
FIGS. 5A-5B are schematic representations of embodiments of a one-pole and two-pole filter bank, respectively.
Figure 5B:
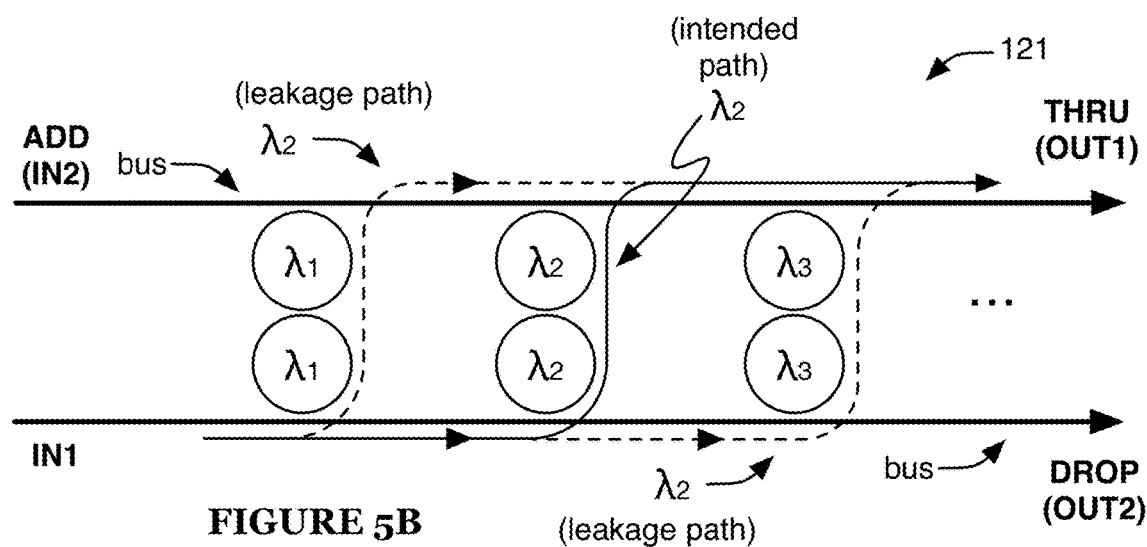
Figure 5C:
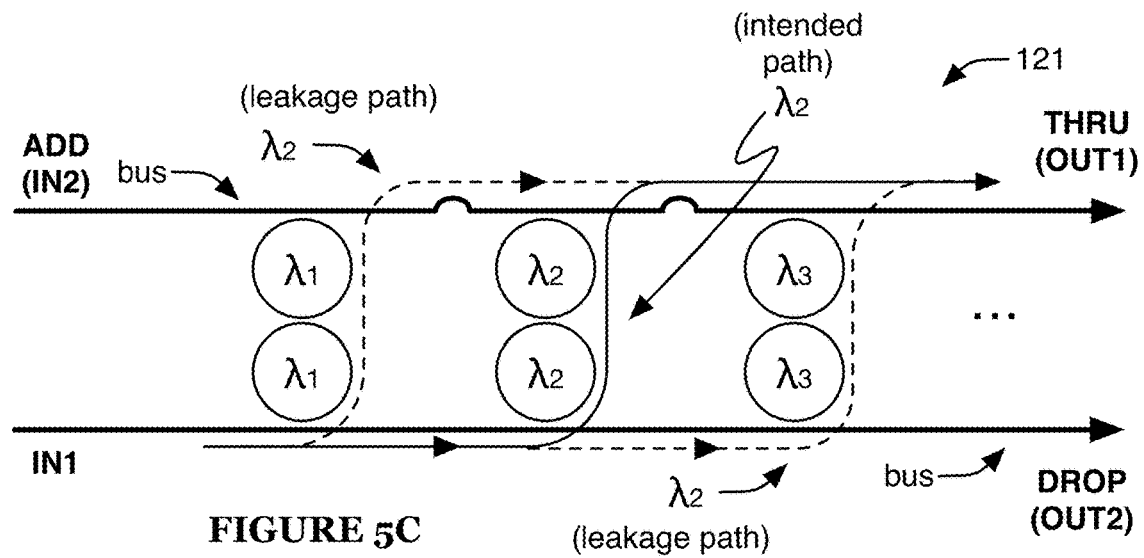
FIG. 5C is a schematic representation of an example of the embodiment of the two-pole filter bank.
Figure 6A:
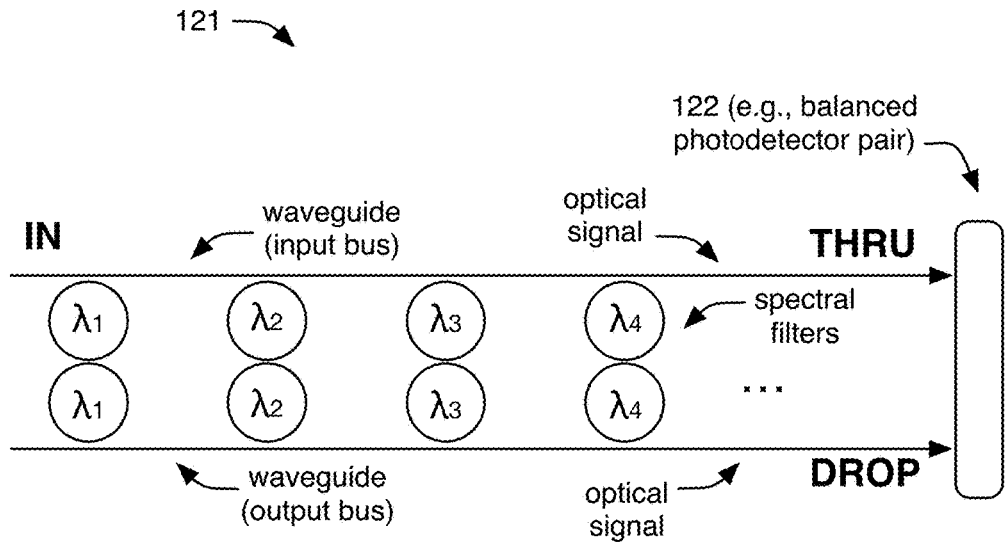
FIGS. 6A-6B are schematic representations of an embodiment of a two-pole filter bank and an example of the embodiment, respectively.

The filter bank preferably includes two buses (e.g., waveguides, such as waveguides supporting a plurality of wavelength channels) for light to travel along (e.g., as shown in FIGS. 5A-5C, 6A, and/or 6B). The waveguides preferably follow substantially similar paths, more preferably wherein the paths are substantially parallel to one another. In one example, the buses include straight segments (e.g., coupled to each other by filters) and curved segments (e.g., allowing the filter bank to take up a more compact region, such as a region with a lower aspect ratio, for a given number of filters), such as defining a boustrophedon. The filter bank preferably defines a configuration (e.g., interferometer-type configuration) in which light travels in the same direction along both buses (e.g., as shown in FIGS. 5B and/or 5C), such as wherein light coupled from the input waveguide into the output waveguide by the filters propagates in substantially the same direction along the output waveguide as it did along the input waveguide. For example, in an embodiment in which light (e.g., the entire input signal, light of a particular channel or channels, etc.) propagates along a first propagation vector defined by the input waveguide (e.g., before coupling across the filter bank by a given filter, such as in a portion of the input waveguide between the given filter and the filter preceding it) and propagates through a second propagation vector defined by the output waveguide (e.g., after coupling across the filter bank by the given filter, such as in a portion of the output waveguide between the given filter and the filter following it), a dot product of the first and second propagation vectors is preferably greater than zero, and in some such examples, the first and second propagation vectors are substantially parallel (e.g., within 1, 5, 10, 15, 20, or 30° of parallel, etc.). However, the filter bank can additionally or alternatively define a configuration in which light travels in opposing directions along the buses (e.g., as shown in FIG. 5A), and/or travels in any other suitable directions.

The filter bank preferably includes a plurality of filters (e.g., wherein each filter includes one or more filter elements, such as the filter elements described above). The filters preferably bridge the gap between the two buses. For example, each filter can include one or more resonators (e.g., microresonators) coupled to each waveguide. The filters are preferably even-pole (e.g., two-pole, four-pole, etc.) filters, such as filters including two (or more) elements (e.g., microresonators) in series, bridging the gap between the waveguides (e.g., as shown in FIGS. 3B, 5B, 6C, 6A, and/or 6B). Each pole of the filter is preferably a microresonator (e.g., micro-ring resonator, micro-disk resonator, etc.), but can additionally or alternatively include any other suitable filter elements. The microresonators are preferably arranged with sufficiently close spacing (e.g., to each other, to the waveguides, etc.) to create a critical coupling between the elements of the filter and/or the buses (e.g., with a gap between the elements equal to or less than a threshold distance, such as 30, 100, 200, 300, 500, 1000, 2000, 10-100, 100-300, 200-500, 300-1000, or 1000-5000 nm, etc.). The resonators of a filter can be substantially identical (e.g., substantially equal diameter, substantially identical wavelength resonance conditions, etc.) or can be different from each other (e.g., enabling use of a Vernier effect to narrow the resonance bandwidth of the filter). However, the filters can additionally or alternatively include any other suitable elements in any suitable configuration.

The filter bank is preferably configured to create a phase shift between light coupled through different filters (e.g., through filters intended for and/or associated with different optical channels, through filters with different resonance wavelengths, etc.). The phase shift is preferably a shift between light paths that would be expected to carry substantial signals on the same wavelength channel, such as the intended light path (e.g., associated with the filter designated for the particular channel) and one or more parasitic (e.g., "leakage") light paths (e.g., associated with filters with resonances close to the particular channel's wavelength, such as filters designated for neighboring channels, filters with higher or lower harmonic resonances close to the particular channel's wavelength, etc.).

Figure 7A:
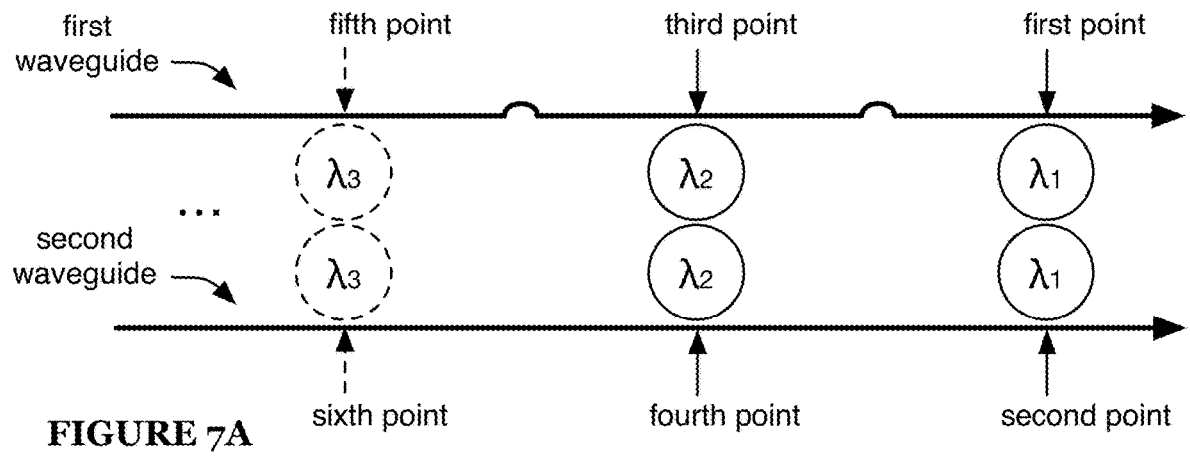
FIGS. 7A-7E are schematic representations of various examples of two-pole filter banks.
Figure 7B:
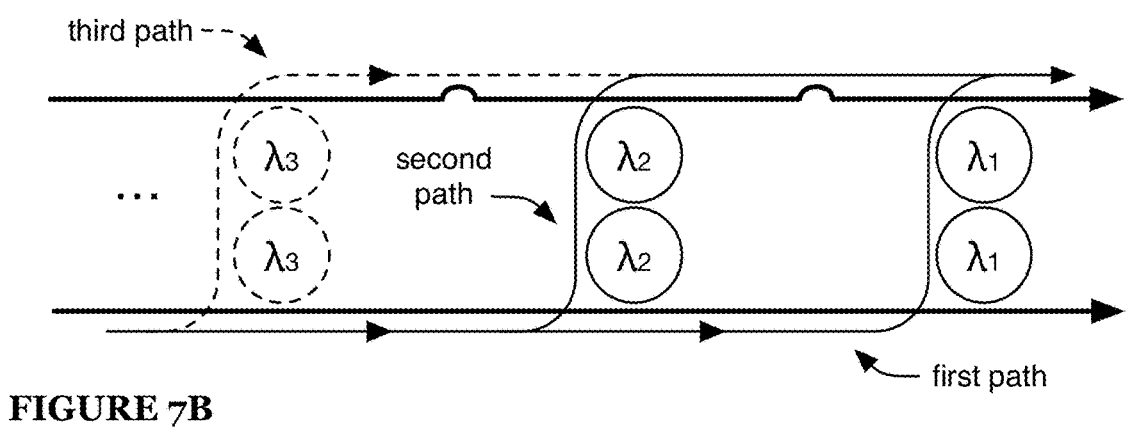
Figure 7C:
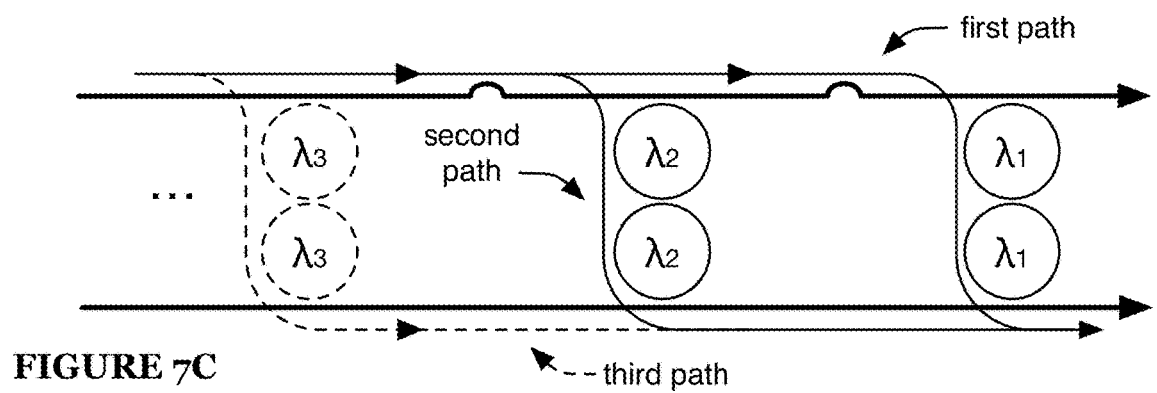
Figure 7D:
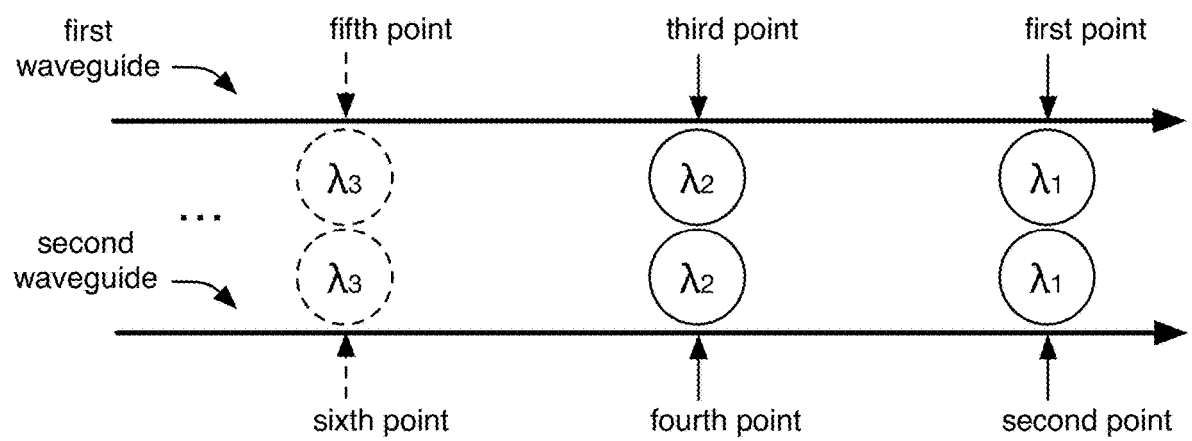
Figure 7E:
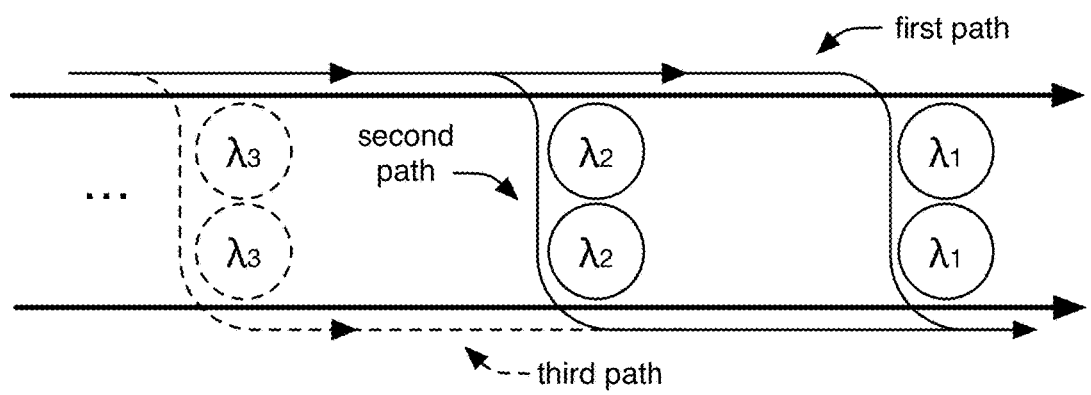

Examples of such light paths are shown in FIGS. 5B and 5C, wherein the solid line indicates the intended light path for light with wavelength $\lambda_2$ (corresponding to the filter designated for channel 2), and the dashed lines indicate undesired light paths (e.g., parasitic light paths such as leakage light paths) for such light (corresponding to the filters designated for channels 1 and 3). As shown in FIG. 5C, in which the two waveguides have different optical path lengths between the filters (e.g., due to curvature and/or other non-linearity in one of the waveguides), the leakage paths can differ in length from the intended path (e.g., wherein the leakage path through the filter designated for channel 1 is longer than the intended path and the leakage path through the filter designated for channel 3 is shorter than the intended path, or vice versa), resulting in phase shifts between light following the intended path and light following one of the leakage paths. Additional examples of this effect are depicted in FIGS. 7A-7C, in which the first, second, and third path share a common start and end, but define three different optical path lengths. In contrast, in examples in which the first and second waveguides have substantially equal optical path lengths between the filters, the lengths of the first, second, and third paths may all be substantially equal (e.g., as shown in FIGS. 7D-7E).

The phase shift is preferably designed to be substantially equal to a target value (or values) between light paths using neighboring filters (e.g., neighboring in wavelength space for the filters' resonance and/or designated channel), but can additionally or alternatively be designed to be substantially equal to one or more target values between any other suitable pairs of light paths (e.g., any expected to carry substantial signals on the same wavelength channel). The phase shift is preferably substantially equal to $\pm\pi/2$ ($+k\pi$ for any integer k) between such paths, which can result in minimal perturbation of one channel by the phase-shifted parasitic signal (e.g., wherein light transmission along the parasitic light path(s) causes minimal change to the signal intended to be carried by the channel). Preferably, the magnitude of k is small (e.g., 0, 1, 2, 3-5, 5-10, etc.), which can function to minimize phase shift disparities between different channels (e.g., wherein each channel includes light of a different wavelength and the difference between wavelengths is much less than the wavelengths, such as less than 5%, 2%, 1%, 0.5%, 0.2%, 0.1%, etc.).

In examples, the phase shift(s) can be within a threshold phase difference of $\pm\pi/2$ ($+k\pi$ for any integer k), wherein the threshold phase difference can be, for example, 0.01, 0.02, 0.05, 0.1, 0.2, 0.3, 0.4, 0.5, 0.6, 0.8, 1, $\pi/32$, $\pi/16$, $\pi/8$, $\pi/4$, 0.001–0.01, 0.01–0.1, 0.05–0.2, 0.1–0.4, 0.2–0.8, 0.5–1, 1–2, $\pi/100-\pi/30$, $\pi/40-\pi/15$, $\pi/20-\pi/10$, $\pi/12-\pi/8$, $\pi/8-\pi/5$, $\pi/4-\pi/2$, and/or $\pi/2-\pi$ radians, and/or any other suitable difference. However, the phase shift(s) can additionally or alternatively be within a threshold phase difference ($+2k\pi$ for any integer k), such as described above, of any other suitable target value (e.g., positive or negative: $\pi/4$, $3\pi/4$, $\pi/8$, $3\pi/8$, $5\pi/8$, $7\pi/8$, $\pi$, etc.; values within one or more ranges such as positive or negative: $0-\pi/8$, $\pi/16-\pi/4$, $\pi/8-3\pi/8$, $\pi/4-7\pi/16$, $3\pi/8-\pi/2$, $\pi/2-5\pi/8$, $9\pi/16-3\pi/4$, $5\pi/8-7\pi/8$, $3\pi/4-15\pi/16$, $7\pi/8-\pi$, etc.). However, the phase shift can alternatively have any other suitable value. The phase shift can be calculated for a representative wavelength associated with the entire optical spectrum used with the filter bank (e.g., wherein the spectrum bandwidth is much less than the wavelength, thereby making the phase shift substantially equal for all wavelength channels), can be calculated separately for each wavelength (e.g., the wavelength associated with a particular filter of the filter bank), and/or calculated in any other suitable manner.

Figure 6B:
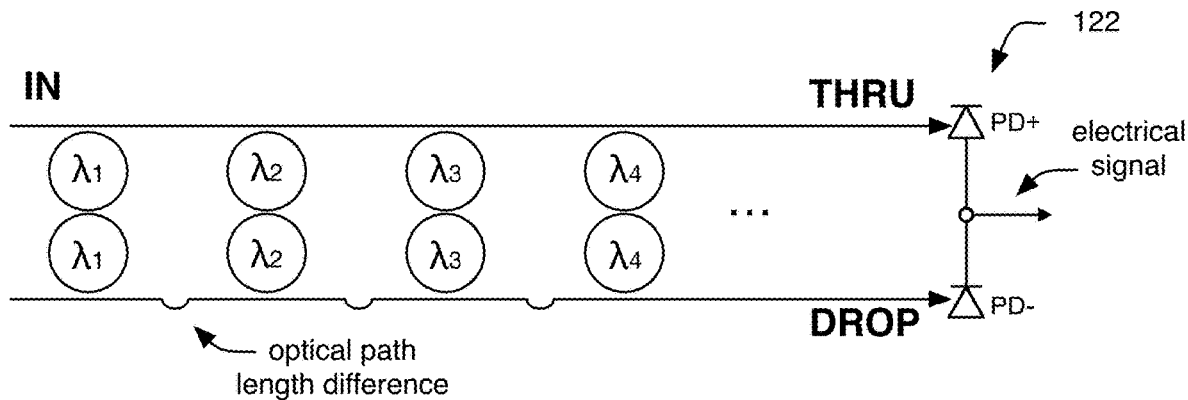

The filters are preferably arranged such that channels neighboring each other in wavelength space also neighbor each other in geometrical space (e.g., arranged in ascending or descending wavelength order along the length of the bus, such as shown in FIGS. 6A-6B for examples in which $\lambda 1<\lambda 2<\lambda 3<\lambda 4$). However, the filters can alternatively be arranged in any other suitable order. In one example, the channels are split into n sub-bands of substantially equal bandwidth, and the filters can be arranged cycling through each sub-band, wherein the phase shift between physically-neighboring filters can be equal to $\pi/(2n)$, such that the difference between wavelength-adjacent filters is $\pi/2$ (e.g., split into four sub-bands, with phase shifts of $\pi/8$ between the physically-neighboring filters). However, the channels can additionally or alternatively be arranged in any other suitable manner. The phase shift achieved is preferably substantially independent of resonator tuning (e.g., substantially constant despite changes in resonator tuning, such as substantially unchanged by voltage applied to the resonator). However, the phase shift can alternately be dependent on resonator state.

The phase shift is preferably achieved using a difference in optical path length between the two buses (e.g., on the input bus vs. the output bus). For example, the buses can include an optical path length difference between the input bus and output bus sections that reside between spatially adjacent filters. This optical path length difference (e.g., input bus path length minus output bus path length, or output bus path length minus input bus path length) is preferably substantially equal to a quarter wavelength offset (e.g., with respect to the medium-specific wavelength, rather than the free-space wavelength) between the effective lengths of the bus waveguides, optionally plus an integer number of full wavelengths, but can alternatively be an offset of any other suitable length; that is, substantially equal to $$\frac{\lambda}{n}(k \pm 1/4),$$

where $\lambda$ is the free-space wavelength, n is the index of refraction of the medium, and k is any integer (e.g., positive integer, negative integer, zero). Preferably, the magnitude of k is small (e.g., 0, 1, 2, 3-5, 5-10, etc.), which can function to minimize phase shift disparities between different channels (e.g., wherein each channel includes light of a different wavelength and the difference between wavelengths is much less than the wavelengths, such as less than 5%, 2%, 1%, 0.5%, 0.2%, 0.1%, etc.). For example, a bus length difference of 95 nm can be used to provide the desired $\pi/2$ phase shift for a (free-space) wavelength of approximately 1550 nm, given the TE group index of 4.2 on a typical silicon photonics platform). However, the optical path length difference can alternatively be any other suitable length, such as a length $$l = \frac{\lambda \cdot \phi}{2\pi n}$$

corresponding to any suitable desired phase shift $\phi$ (e.g., as described above).

In some embodiments, the magnitude of the path length difference is substantially equal between each bus section (e.g., the sections residing between spatially adjacent filters), whereas in other embodiments, the magnitude of the path length difference is different for the different bus sections. In some embodiments, the sections of one bus are all longer than the sections of the other bus (e.g., each input bus section is longer than the opposing output bus section, each input bus section is shorter than the opposing output bus section); in other embodiments, some input bus sections are longer than the opposing output bus sections, and other input bus sections are shorter than the opposing output bus sections.

In one example, curvature and/or other non-linearity on one of the waveguides is used to increase its path length, such as compared with a substantially straight opposing waveguide (e.g., as shown in FIG. 6B) or as compared with any other suitable waveguide. However, the filter bank can additionally or alternatively include path length differences achieved in any other suitable manner, and/or the phase shift can be achieved in any other suitable manner.

However, the system can additionally or alternatively include any other suitable optical filters (and/or filter banks). Although referred to herein as optical filters, a person of skill in the art will recognize that the filters can additionally or alternatively include optical switches, optical modulators, and/or any other suitable elements.

Each detector preferably functions to transduce an optical signal (e.g., into an electrical signal). The computation module preferably includes one detector (e.g., summation detector) associated with each spectral filter bank. However, the computation module can alternatively combine signals from multiple spectral filter banks, wherein the combined signal is input to a single detector. The detectors preferably include one or more photodetectors (e.g., photodiodes), but can additionally or alternatively include any other suitable detectors. In a first embodiment, each detector includes a pair of photodiodes (e.g., balanced photodetector), such as one each on the THRU and DROP ports of the spectral filter bank (e.g., as shown in FIG. 6B). In a second example, the detector is a single photodiode (e.g., on either the THRU or the DROP port). However, the detector can additionally or alternatively include any other suitable arrangement of photodiodes and/or other detectors. Each detector output is preferably delivered to the control module (e.g., as an electrical signal). However, one or more detector outputs can additionally or alternatively be used to drive one or more transducers (e.g., transducers of the same input module, of another input module, etc.). For example, the detector outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009,135).

The splitter preferably functions to split a signal (e.g., received from the input module), propagating the split signal along a plurality of paths (e.g., waveguides). The number of paths onto which the signal is split is preferably based on the number of spectral filter banks in the computation module (e.g., one path for each weight bank, two paths for each weight bank, three paths for each weight bank, etc.). The splitting is preferably wavelength-independent; alternatively, different wavelength selective elements can be used to split each channel (or set of multiple channels, such as adjacent channels) independently. The signal is preferably split equally (or substantially equally) between all paths and/or spectral filter banks, but can alternatively be split with any other suitable intensity distribution. In one example, the splitter is a tree splitter (e.g., including a plurality of two-way splitters arranged in a binary tree). In a second example, the splitter implements inverse design techniques.

In a first embodiment, the signal from the input module is split directly and propagated to all of the spectral filter banks (e.g., as shown in FIG. 3B). In a second embodiment, splitters are interspersed with (and/or integrated with) spectral filter banks. In this embodiment, the splitter elements and filter banks can be arranged in a tree structure (e.g., binary tree structure, such as shown in FIGS. 8A and/or 8B).

However, the system can additionally or alternatively include any other suitable splitter(s) in any suitable arrangement, or can include no splitter (e.g., wherein the computation module includes a single spectral filter bank and detector which filter the optical input signal). Further, the computation module can additionally or alternatively include any other suitable elements in any suitable arrangement.

1.3 Control Module.

The control module 130 preferably functions to control and/or receive outputs from the other elements of the system. The control module preferably controls (e.g., provides electrical control signals to) the transducers of the input module and/or the spectral filter banks (e.g., the modulators) of the computation module. The control module preferably receives outputs (e.g., electrical signals) from the detectors. The control of the transducers, filters and/or other elements can optionally be altered based on the received outputs.

The control module can include, for example, one or more one or more processors, preferably electronic processors (e.g., CPU, GPU, microprocessor, FPGA, ASIC, etc.), storage elements (e.g., RAM, flash, magnetic disk drive, etc.), serializers, deserializers, digital to analog converters (e.g., which can function to generate control signals for the transducers, filters, and/or other controlled elements), analog to digital converters (e.g., which can function to encode the detector output signals), and/or any other suitable elements.

However, the system can additionally or alternatively include any other suitable elements in any suitable arrangement.

1.4 Material Platforms.

The system can include (e.g., be made of) any suitable materials. The system (and/or elements thereof, such as some or all of the photonic elements) can be implemented on one or more material platforms (e.g., photonic integrated circuit platforms).

In one embodiment, the system can include elements implemented in a silicon photonics platform (e.g., implemented by one or more foundries such as AIMPhotonics, IME, IMEC, etc.), which can include silicon, silicon doping, silicon oxides, passive silicon components (e.g., waveguides, filters, etc.), and/or germanium-based elements (e.g., detectors, filters and/or modulators, such as EAM modulators, etc.). Additionally or alternatively, the system can include elements implemented in one or more III-V platforms (e.g., JePPiX consortium SMART Photonics and/or HHI platforms, etc.), which can include materials such as indium compounds, phosphide compounds, gallium compounds, arsenide compounds, and/or any other suitable III-V semiconductors (e.g., InP substrate with InGaAsP features). In an example of this embodiment, the emitters (e.g., laser array) are fabricated in the III-V semiconductor platform, the multiplexer is fabricated in either the III-V semiconductor platform or the silicon photonics platform, and substantially all other photonic elements of the system (e.g., except some or all waveguides associated with the emitters) are fabricated in the silicon photonics platform.

The system can additionally or alternatively include elements implemented in a zero-change silicon photonics platform (e.g., platform typically used for microelectronics), preferably wherein some or all photonic and electronic elements of the system are implemented monolithically (e.g., collocated in the same integrated circuit).

The system can additionally or alternatively include elements implemented in a hybrid silicon/III-V photonics platform, such as wherein silicon photonics elements and III-V photonics elements (e.g., optical amplifiers, laser sources, etc.) are implemented monolithically (e.g., collocated in the same integrated circuit). For example, a III-V semiconductor substrate (e.g., InP) can support both the silicon photonics elements and III-V photonics elements.

The system can additionally or alternatively include elements implemented in a silicon nitride photonics platform (e.g., JePPiX consortium TriPLeX platform), such as including waveguides defined by silicon nitride within a silicon oxide.

The system can additionally or alternatively include elements implemented in a silicon-graphene photonics platform, such as wherein one or more photonic elements (e.g., active elements, such as detectors, filters, modulators, etc.) are implemented using graphene, other graphitic materials, and/or other 2-D materials.

The system can additionally or alternatively include elements implemented in a lithium niobate photonics platform, which can include one or more photonic elements implemented using lithium niobate, such as thin-film lithium niobate.

In a specific example, the system includes elements fabricated such as described in U.S. Pat. No. 10,009,135, issued 26 Jun. 2018 and titled "System and Method for Photonic Processing", which is hereby incorporated in its entirety by this reference (e.g., as described regarding fabrication on silicon-on-insulator wafers).

However, the system can additionally or alternatively be implemented in any other suitable material platform, and can additionally or alternatively include any other suitable materials.

2. Method.

Figure 11:
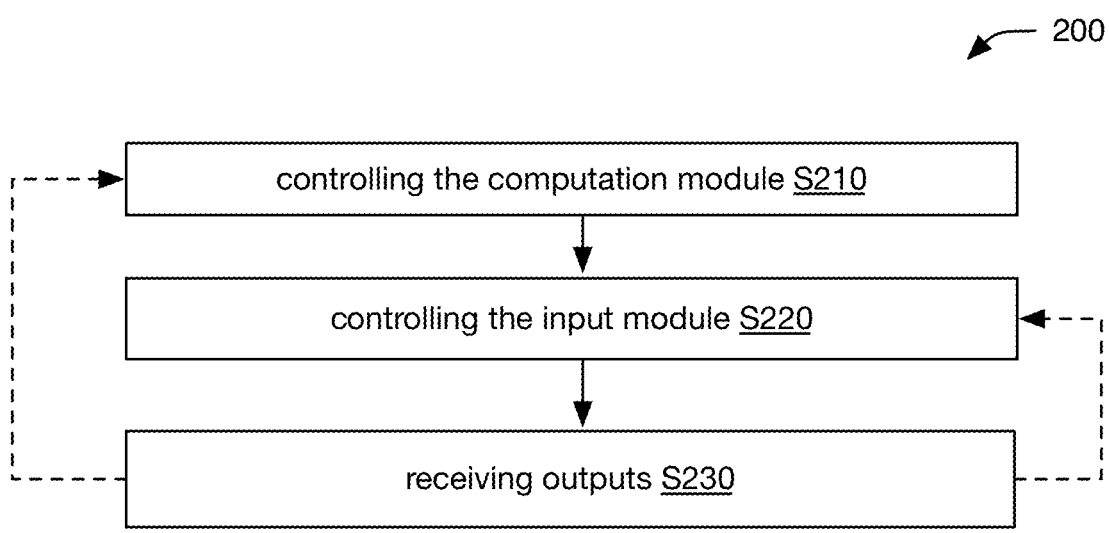
FIG. 11 is a schematic representation of an embodiment of the method.

A method 200 is preferably implemented using the system 100 described above, but can additionally or alternatively be implemented using any other suitable system(s). The method preferably includes: controlling the computation module S210; controlling the input module S220; and/or receiving outputs from the computation module S230 (e.g., as shown in FIG. 11).

In some embodiments, the method 200 includes one or more elements such as described in U.S. Pat. No. 10,009,135, issued 26 Jun. 2018 and titled "System and Method for Photonic Processing", which is hereby incorporated in its entirety by this reference (e.g., implementing the method of U.S. Pat. No. 10,009,135 using the system 100 described herein). However, the method can additionally or alternatively include any other suitable elements.

Controlling the computation module S210 preferably includes controlling one or more of the spectral filter banks, more preferably controlling all the spectral filter banks. For example, S210 can include providing control signals (e.g., applying control voltages) to one or more optical filters, thereby controlling the optical filters' interaction with the optical signal (e.g., defining the matrix, or a subset thereof such as a row or column, by which the input vector is multiplied). In a specific example, each channel is associated with a respective weight (e.g., representing an element of the vector or matrix by which the input vector is multiplied), and S210 includes, for each of these weights, determining a respective control signal (e.g., control voltage) and providing the control signals to the filter associated with the appropriate channel (the channel associated with the weight).

Controlling the input module S220 preferably includes controlling one or more transducers to emit light (e.g., light encoding an input signal, such as the input vector). The emitted light preferably propagates through the computation module, thereby causing the desired calculation to be performed (e.g., multiplying the input vector by the matrix). In one example, the emitted light interacts with the spectral filter banks, thereby being filtered (e.g., according to the spectral filter weights associated with the matrix), and is then sampled by the detectors, generating an output signal (e.g., wherein the emitted light is received at the input waveguide of a spectral filter bank, and portions thereof are coupled into the output waveguide of the spectral filter bank by the filters).

The emitted light is preferably associated with multiple optical channels, each channel associated with a different optical characteristic (e.g., wavelength), wherein the emitted light includes multiple portions, each corresponding to a different channel (e.g., different wavelength bands). Ideally, emitted light of any particular channel is only coupled into the output waveguide via the filter associated with that channel (e.g., via the "intended path" for that channel, such as described above). In this ideal scenario, a "signal" subportion of the channel is coupled through the associated filter into the output waveguide (e.g., wherein the ratio of the signal subportion amplitude to the entire channel amplitude is preferably a substantially linear function of the associated weight, such as substantially equal to the weight), and a "remainder" subportion of the channel is not coupled into the output waveguide and instead continues along the input waveguide. However, additional "leakage" subportions of the channel may be coupled through one or more other filters (e.g., filters corresponding to adjacent channels in wavelength space) into the output waveguide. The ratio of the amplitude of the leakage subportions (and/or any one leakage subportion, corresponding to leakage through a single filter) to the amplitude of the signal subportion and/or to the entire channel amplitude is preferably less than a threshold value (e.g., 0.1%, 0.2%, 0.5%, 1%, 2%, 5%, 10%, 15%, 20%, 25%, 0.01-0.1%, 0.1-0.3%, 0.3-1%, 1-2%, 2-5%, 5-10%, 10-25%, or 25-50%, etc.) but can alternatively have any other suitable value. In examples in which the spectral filter bank includes path length differences between the intended path and the leakage paths, these path length differences can result in phase shifts between the signal subportion and the leakage subportion(s). As the signal and leakage subportions are combined in the output waveguide, such phase shifts can reduce the effect of the leakage subportions, resulting in an output amplitude (for the channel) closer to the signal subportion amplitude as compared with examples in which the spectral filter bank does not include such path length differences. In some such examples, the output amplitude can be substantially equal to the signal subportion amplitude.

Receiving outputs from the computation module S230 preferably functions to sample the results of the computation. The outputs are preferably received from the detectors, but can additionally or alternatively be received from any other suitable elements. In a first embodiment, data associated with the received outputs is stored. For example, an analog electrical signal generated at the detector can be converted to a digital signal and stored in a storing element of the control module (e.g., RAM). In a second embodiment, the received outputs are used to drive one or more transducers (e.g., transducers of the same input module, of another input module, etc.). For example, the received outputs can be used to drive transducers such as described in U.S. Pat. No. 10,009,135, issued 26 Jun. 2018 and titled "System and Method for Photonic Processing", which is hereby incorporated in its entirety by this reference (e.g., as described regarding FIG. 2 of U.S. Pat. No. 10,009,135). However, the outputs can additionally or alternatively be received and/or used in any other suitable manner.

The method 200 preferable includes repeating S220 (e.g., changing the signal encoded by the emitted light during each such repetition). While repeating S220, the method preferably includes substantially maintaining the same spectral filter bank control. However, the method can alternatively include changing the filter bank control (e.g., encoding a new matrix) between (and/or during) different repetitions of S220. The method preferably includes continuing to perform S230 throughout the repetitions of S220 (e.g., receiving the outputs associated with each repetition of S220).

Repeating S220 can function to enable rapid computation based on many different input signals. In one example, S220 is repeated at a rate of 10 GS/s (e.g., 10 billion different input signals per second). In a specific example, in which the system includes 256 channels (e.g., 256 emitters) and each channel encodes a 4-bit signal (e.g., 4 mantissa bits), this repetition rate can result in an input signal rate of over 10 Tbit/s.

Figure 9A:
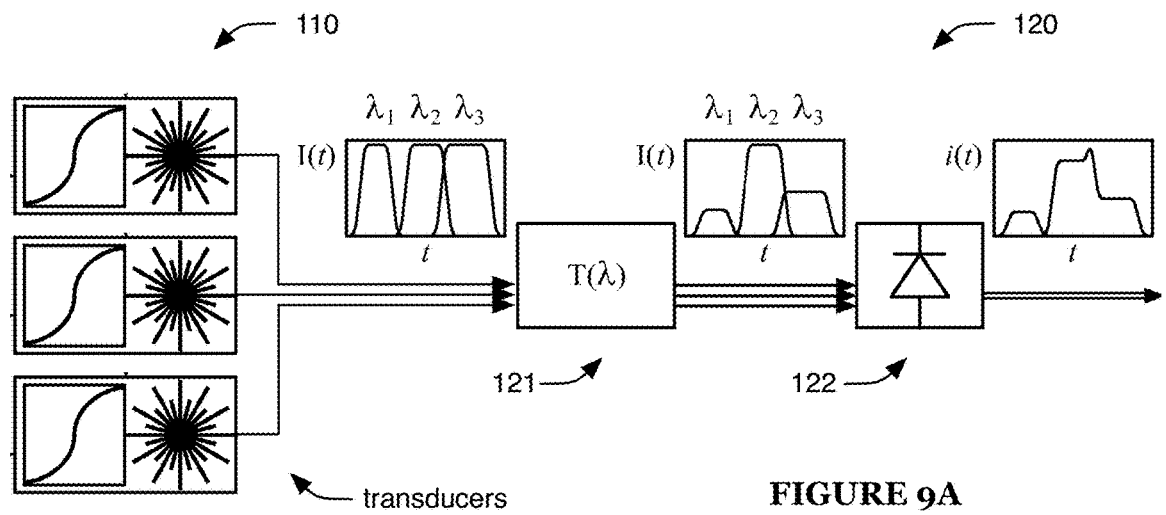
FIGS. 9A-9B are schematic representations of a first and second example, respectively, of photonic elements of the system.
Figure 9B:
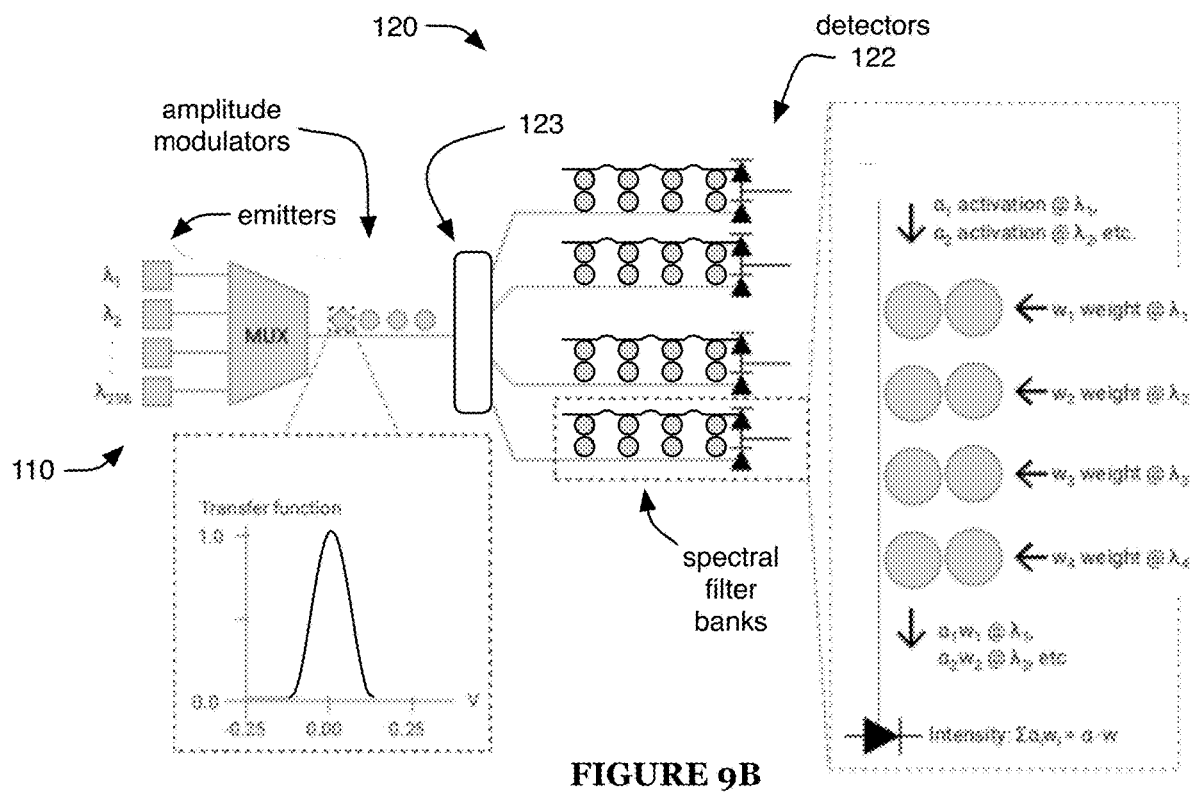

In one example, S210 and/or S220 are performed such as shown in FIG. 9B. Although FIG. 9B depicts specific examples of various elements of the input module 110 (e.g., transducers such as emitters, filters, and/or modulators) and computation module 120 (e.g., spectral filter banks, detectors, etc.), a person of skill in the art will recognize that the S210 and/or S220 could additionally or alternatively be performed using a system with any other suitable examples of these elements (e.g., as described above regarding the system 100).

However, the method can additionally or alternatively include any other suitable elements performed in any suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A system comprising a spectral filter bank, the spectral filter bank comprising:
   a first waveguide;
   a second waveguide;
   a first wavelength-selective optical filter arranged between a first point of the first waveguide and a second point of the second waveguide, wherein the first wavelength-selective optical filter is configured to couple light of a first wavelength between the first point and the second point;
   a second wavelength-selective optical filter arranged between a third point of the first waveguide and a fourth point of the second waveguide, wherein the second wavelength-selective optical filter is configured to couple light of a second wavelength between the third point and the fourth point;
   wherein:
   the spectral filter bank defines a first path between the first and fourth points via the first wavelength-selective optical filter;
   the spectral filter bank defines a second path between the first and fourth points via the second wavelength-selective optical filter;
   an optical path length difference between the first path and the second path is substantially non-zero; and
   the spectral filter bank is configured to couple light between the first and fourth points such that:
   a first portion of the light traverses the first path and a second portion of the light traverses the second path; and
   due to the optical path length difference, the first portion of the light becomes phase shifted relative to the second portion of the light.

2. The system of claim 1, wherein:
   the first wavelength-selective optical filter comprises a first tunable filter; and
   the second wavelength-selective optical filter comprises a second tunable filter.

3. The system of claim 2, wherein:
   the first tunable filter is a first microresonator; and
   the second tunable filter is a second microresonator.

4. The system of claim 3, wherein:
   the first wavelength-selective optical filter is a first even-pole filter; and
   the second wavelength-selective optical filter is a second even-pole filter.

5. The system of claim 1, wherein:
   the spectral filter bank further comprises:
   a third waveguide;
   a third wavelength-selective optical filter arranged between a fifth point of the first waveguide and a sixth point of the second waveguide, wherein the third wavelength-selective optical filter is configured to couple light of a third wavelength between the fifth point and the sixth point;
   the spectral filter bank defines a third path between the first and sixth points via the third wavelength-selective optical filter;
   the spectral filter bank defines a fourth path between the first and sixth points via the second wavelength-selective optical filter; and
   a second optical path length difference between the third path and the fourth path is substantially non-zero.

6. The system of claim 5, wherein the optical path length difference is substantially equal to the second optical path length difference.

7. The system of claim 6, wherein the optical path length difference is within $\lambda/8n$ of $$\frac{\lambda}{n}(k \pm 1/4),$$

wherein $\lambda$ is the first wavelength, n is an index of refraction of the spectral filter bank, and k is an integer.

8. The system of claim 7, wherein the optical path length difference is substantially equal to $\lambda/4n$.

9. The system of claim 1, wherein
   the second waveguide defines a substantially non-linear optical path between the second point and the fourth point.

10. The system of claim 9, wherein the first waveguide defines a substantially linear optical path between the first point and the third point.

11. The system of claim 1, wherein the optical path length difference is within $\lambda/8n$ of $\lambda/n(k\pm\frac{1}{4})$, wherein $\lambda$ is the first wavelength, n is an index of refraction of the spectral filter bank, and k is an integer.

12. The system of claim 11, wherein the optical path length difference is substantially equal to $\lambda/4n$.

13. The system of claim 1, wherein:
   the spectral filter bank couples light of the first wavelength along the first path, such that the light of the first wavelength coupled along the first path passes through the fourth point and not the third point; and
   the spectral filter bank couples light of the second wavelength along the second path, such that the light of the second wavelength coupled along the second path passes through the first point and not the second point.

14. The system of claim 13, wherein the spectral filter bank couples an additional portion of light of the first wavelength along the second path, wherein, due to the optical path length difference, the additional portion of light coupled along the second path is phase shifted relative to the light of the first wavelength coupled along the first path.